(12) United States Patent
Belleville

(10) Patent No.: US 7,187,453 B2
(45) Date of Patent: Mar. 6, 2007

(54) OPTICAL MEMS CAVITY HAVING A WIDE SCANNING RANGE FOR MEASURING A SENSING INTERFEROMETER

(75) Inventor: Claude Belleville, L'Ancienne-Lorette (CA)

(73) Assignee: Opsens Inc., Sainte-Foy (CA)

( * ) Notice: Subject to any disclaimer, the term of this patent is extended or adjusted under 35 U.S.C. 154(b) by 301 days.

(21) Appl. No.: 10/829,980

(22) Filed: Apr. 23, 2004

(65) Prior Publication Data

US 2005/0237538 A1 Oct. 27, 2005

(51) Int. Cl.
  G01B 11/02 (2006.01)
  G01B 9/02 (2006.01)
  G02B 26/00 (2006.01)

(52) U.S. Cl. .................... 356/504; 356/519

(58) Field of Classification Search ............... 356/454, 356/477, 479, 480, 482, 497, 503, 519; 250/227.19, 250/227.27
  See application file for complete search history.

(56) References Cited

U.S. PATENT DOCUMENTS

| | | | |
|---|---|---|---|
| 4,678,904 A | 7/1987 | Saaski et al. | |
| 4,825,262 A | 4/1989 | Mallinson | |
| 4,859,060 A | 8/1989 | Katagiri et al. | |
| 5,301,001 A | 4/1994 | Murphy et al. | |
| 5,349,439 A | 9/1994 | Graindorge et al. | |
| 5,392,117 A | 2/1995 | Belleville et al. | |
| 5,517,303 A * | 5/1996 | Cole et al. ................. | 356/479 |
| 5,561,523 A | 10/1996 | Blomberg et al. | |
| 5,701,193 A | 12/1997 | Vogel et al. | |
| 5,739,945 A | 4/1998 | Tayebati | |
| 5,838,484 A | 11/1998 | Goossen | |
| 5,909,280 A | 6/1999 | Zavracky | |
| 6,295,130 B1 | 9/2001 | Sun et al. | |
| 6,341,039 B1 | 1/2002 | Flanders et al. | |
| 6,381,022 B1 | 4/2002 | Zavracky | |
| 6,424,466 B1 | 7/2002 | Flanders | |
| 6,842,254 B2 * | 1/2005 | Van Neste et al. .......... | 356/497 |
| 2003/0039428 A1 | 2/2003 | Okamato et al. | |

* cited by examiner

Primary Examiner—Gregory J. Toatley, Jr.
Assistant Examiner—Michael A. Lyons
(74) Attorney, Agent, or Firm—Ogilvy Renault, LLP

(57) ABSTRACT

A method for measuring the cavity length of a remote sensing interferometer by locally replicating the state of the remote sensing interferometer by way of a local interferometer. The local interferometer is produced by micro-electro-mechanical micro machining techniques, thus obtaining a highly accurate and reliable fiber optic sensing at a cost comparable to electronic sensing devices.

92 Claims, 19 Drawing Sheets

OPTICAL MEMS CAVITY HAVING A WIDE SCANNING RANGE FOR MEASURING A SENSING INTERFEROMETER

CROSS-REFERENCE TO RELATED APPLICATIONS

This is the first application for this invention.

FIELD OF THE INVENTION

The invention relates to micro electromechanical device systems (MEMS). More specifically, the invention relates to a microelectromechanical tuneable Fabry-Perot demodulator.

BACKGROUND OF THE INVENTION

Fiber optic sensors are considered as valuable replacements to conventional sensors for environments where immunity against electromagnetic field, small size and high operating temperature are required. Numerous types of sensors have been developed over the years including, among others, intensity, interferometric and wavelength based sensors. Intensity based sensors never proved to be reliable, while fiber Bragg gratings require a costly optical demodulator for measuring minute wavelength shift. Fabry-Perot interferometric sensors deliver very good performance, they are flexible as they can be built to measure most physical and chemical parameters, and the sensors themselves can be made at a very low cost. High performance optical demodulators however are still too expensive and bulky too compete with conventional electrical sensors.

In the prior art, high coherence light sources such as lasers are often used for measuring the interferometric differential path length that changes as function of the parameter to be measured. Laser light source are however limited to the measurement of the relative change of interferometric sensors and thus, they are limited to dynamic measurements as taught by U.S. Pat. No. 5,301,001 Murphy et al., Apr. 5, 1994. The precision that can be attained is also strongly dependant on the wavelength stability. Wavelength stability is however costly to achieve.

White light interferometric sensors, using a broadband light source instead of a laser, are best suited for measuring the absolute path length of a sensor interferometer. U.S. Pat. No. 5,392,117 to Belleville et al., and U.S. Pat. No. 5,349,439 to Graindorge et al., teach the use of a Fizeau interferometer for the measurement of the absolute optical path length of a sensing interferometer. U.S. patent application Ser. No. 20030039428 to Okamato et al. shows some methods for the data processing of cross-correlated signals obtained from similar white light interferometric sensors. It is shown that these methods are fairly robust against light source instabilities. But unless the severity of the environment justifies it, these methods are nonetheless too expensive and bulky to compete with conventional techniques. Another drawback comes from the use of low cost silicon CCD array detectors that limit the wavelength of the light source below 1000 nm, thus preventing the use of most telecommunication components in the near infrared, such as LED's and single mode fibers.

U.S. Pat. No. 4,678,904 to Saaski et al. describes relevant teaching on the fabrication of low cost Fabry-Perot sensors using photolithography for the production of the sensors.

The use of silicon micromachining techniques, often referred to as microelectromechanical systems (MEMS), is very well suited for the production of Fabry-Perot interferometric devices. Fabry-Perot MEMS devices can be produced at very low cost while assuring the highest quality. Microelectromechanical tuneable Fabry-Perot filters have thus been proposed in the prior art for making low cost spectrophotometric measurements of interferometric sensors as taught by U.S. Pat. No. 4,859,060 to Katagiri et al. In this case, the Fabry-Perot is of high finesse and is used to scan through selected single wavelength so as to obtain the spectrophotometric content of the light signal. This method is however poorly efficient with a very low throughput that limits speed, resolution, accuracy and long term stability of the measurement. A variety of similar microelectromechanical tuneable filters have been proposed in the prior art for performing similar spectrophotometric light measurements: U.S. Pat. No. 6,424,466 to Flanders; U.S. Pat. No. 6,381,022 to Zavracky; U.S. Pat. No. 6,341,039 to Flanders et al.; U.S. Pat. No. 6,295,130 to Sun et al.; U.S. Pat. No. 5,909,280 to Zavracky; U.S. Pat. No. 5,838,484 to Goossen; U.S. Pat. No. 5,739,945 to Tayebati; U.S. Pat. No. 5,701,193 to Vogel et al.; U.S. Pat. No. 5,561,523 to Blomberg et al.; U.S. Pat. No. 4,825,262 to Mallinson. For the previously proposed electromechanical Fabry-Perot, the finesse is high so that they are being used as spectrophotometers or wavelength filters.

Therefore, there is a need for a high performance low cost micro opto-electromechanical demodulator for efficiently measuring the path length difference of interferometric sensors.

SUMMARY OF THE INVENTION

Accordingly, it is an object of the present invention is to provide a low cost microelectromechanical low finesse tuneable Fabry-Perot demodulator used as a local interferometric correlator for measuring the path length difference of a remote interferometric fiber optic sensor.

It is another object of the present invention to provide high performance optical demodulators for measuring the absolute path length difference of interferometric fiber optic sensors by using them in tandem for correlating the optical signals.

It is another object of the present invention to provide a microelectromechanical tuneable Fabry-Perot demodulator with a low finesse cavity varying over a range of more than 15 microns.

It is yet another object of the invention to provide an optical demodulator capable of using infrared light sources.

It is a further object of the invention to provide a low cost high performance optical demodulator for measuring the path length difference of single mode or multimode fiber optic interferometric sensors.

More specifically, the present invention provides a method for measuring a sensing interferometer path length. The method comprises providing a micro-electromechanical system (MEMS) Fabry-Perot cavity, the Fabry-Perot cavity having a cavity length and being formed by a first surface and a second surface. Also, the method comprises admitting into the Fabry-Perot cavity a broadband light signal from the sensing interferometer. Finally, the method comprises varying the cavity length for obtaining an optimal output signal from the Fabry-Perot cavity and determining, from the cavity length at optimal output signal, the sensing interferometer path length.

The present invention also provides for a Fabry-Perot micro-electromechanical system (FP-MEMS) device, used in the measurement of the sensing interferometer path length, the path length having a path length range. The FP-MEMS device comprises a first surface and a second surface forming a Fabry-Perot cavity having a variable cavity length and also comprises a substrate comprising the first surface and being adapted to relay light from the sensing interferometer to the Fabry-Perot cavity. The FP-MEMS device also comprises a deflectable diaphragm supported by the substrate and comprising the second surface. Finally the FP-MEMS device comprises means for deflecting the diaphragm over at least the same range as the path length range of the sensing interferometer path length.

The present invention also provides for an apparatus for measuring a sensing interferometer path length. The apparatus comprises a micro-electromechanical system (MEMS) Fabry-Perot cavity having a cavity length, and being adapted to admit a broadband light signal from the sensing interferometer and to produce an output light signal. The apparatus also comprises means for varying the cavity length and a detector for receiving the output light signal and for providing an optimal output signal upon varying the cavity length. Finally, the apparatus comprises means for measuring the cavity length to thereby determine from the cavity length at optimal output signal, the sensing interferometer path length.

It is a second large aspect of the present invention to provide a method and a Fabry-Perot cavity MEMS device having a diaphragm that can be brought into oscillation to thereby vary the length of the Fabry-Perot cavity.

More specifically, it is provided a method for varying a cavity length of a micro-electromechanical system (MEMS) Fabry-Perot cavity. The method comprises providing a MEMS Fabry-Perot cavity formed by a first surface and a second surface, one of the surfaces forming at least a part of a deflectable diaphragm and bringing the diaphragm in oscillation at a diaphragm natural oscillation frequency to thereby vary the cavity length of the MEMS Fabry-Perot cavity.

It is also provided a Fabry-Perot micro-electromechanical system (FP-MEMS) device that comprises a first surface and a second surface forming a Fabry-Perot cavity having a variable cavity length. The FP-MEMS device also comprises a substrate comprising the first surface. Also, the FP-MEMS device comprises a deflectable diaphragm supported by the substrate and comprising the second surface. Finally, the FP-MEMS device comprises means for driving the deflectable diaphragm into oscillation at a frequency corresponding to a diaphragm natural oscillation frequency.

It is a third large aspect of the present invention to provide a method and a MEMS device having a cavity that is partly formed with a pre-shaped and deflectable diaphragm, the length of the cavity being varied by deflecting the diaphragm.

More specifically, it is provided a method for varying a cavity length of a micro-electromechanical system (MEMS) cavity. The method comprises providing a MEMS cavity formed by a first surface and a second surface, the second surface forming at least a part of a deflectable diaphragm, wherein said deflectable diaphragm has a pre-determined shape and a perimeter. Finally, the method comprises deflecting the diaphragm towards the first surface, starting at the perimeter of the diaphragm, to thereby vary the cavity length of the MEMS cavity.

It is also provided for a micro-electromechanical system (MEMS) device that comprises a cavity having a first end surface and a second end surface. The MEMS device also comprises a substrate comprising the first end surface and an attractive surface. Also, the MEMS device comprises a deflectable diaphragm supported by the substrate, the diaphragm having a pre-determined shape and comprising a perimeter and the second end surface, wherein said perimeter is in close proximity to said attractive surface. Finally, the MEMS device comprises means for deflecting the diaphragm towards the attractive surface starting with the perimeter of the diaphragm.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

Figure 1:
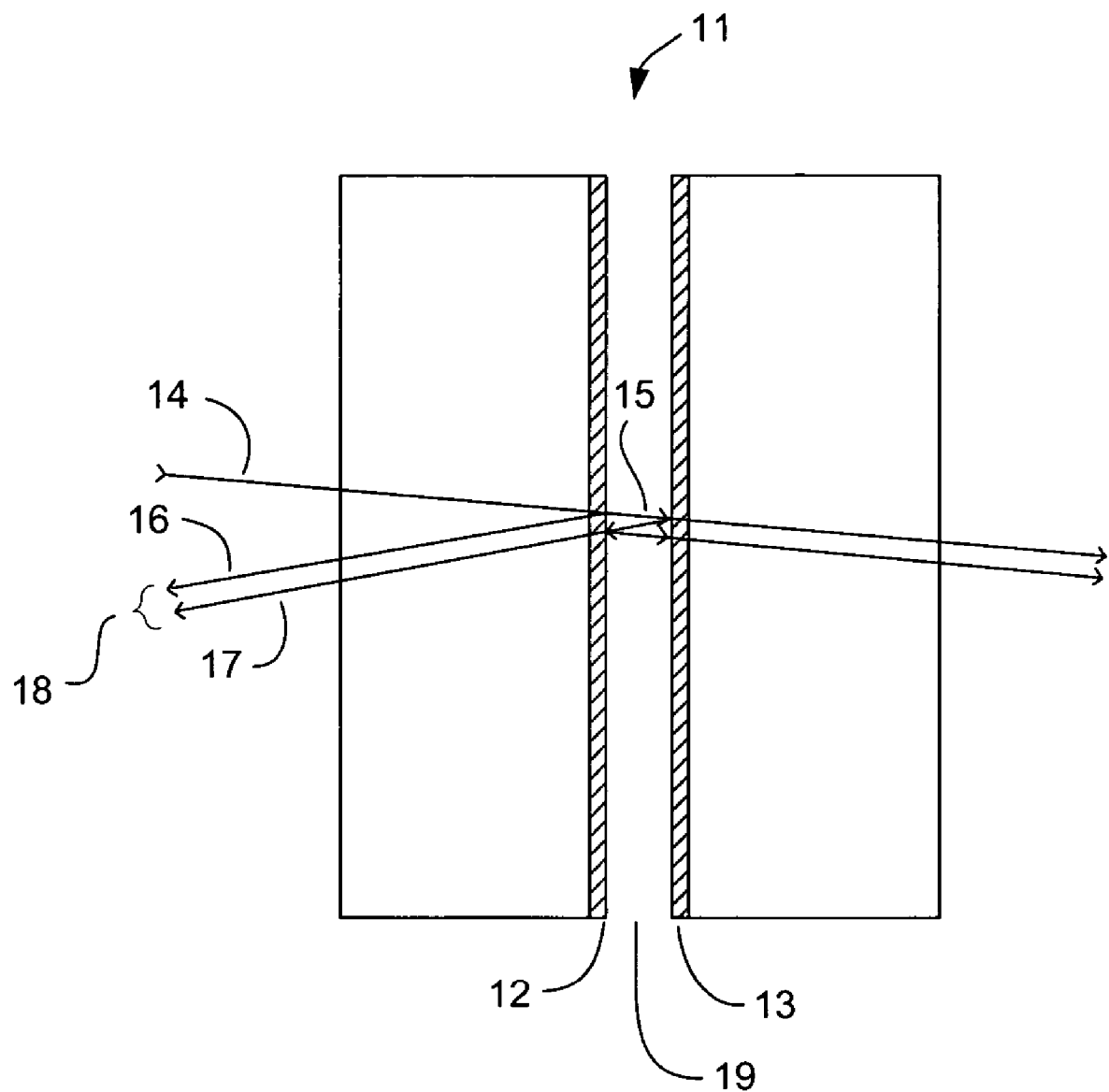
FIG. 1 is a schematic view of a Fabry-Perot interferometer in accordance with the prior art.

FIG. 1 shows a schematic view of a Fabry-Perot 11 (FP) interferometer. A FP is made of two mirrors 12, 13 facing each others. In the description of the preferred embodiments, we will consider the mirrors 12, 13 to be plane even though they can be curved mirrors. A light beam 14 directed toward the FP interferometer 11 is partially reflected by a first mirror 12. Portion of the light signal 15 continues to be partially reflected by a second mirror 13. The reflected beams 16, 17 combine and interfere together to give rise to an interferential pattern where the intensity is modulated as function of wavelength. If losses are neglected, reflected light beam 18 of the Fabry-Perot interferometer 11 is given by the following relation:

$$R(\lambda, d) = 1 - \frac{1}{1 + F \cdot \sin^2\left[\frac{2 \cdot \pi \cdot n \cdot d}{\lambda}\right]} \quad (1)$$

where:

n is the refractive index of the media between the mirrors 12, 13;

d is the cavity length, or the distance between mirrors 12, 13;

λ is the wavelength of the light signal 14; and

F is the finesse and can be approximated by $4R/(1-R)^2$, R being defined as the reflectance of mirrors 12, 13.

Similarly, the transmitted optical signal is given by the following relation:

$$T(\lambda, d) = \frac{1}{1 + F \cdot \sin^2\left[\frac{2 \cdot \pi \cdot n \cdot d}{\lambda}\right]} \quad (2)$$

Figure 2:
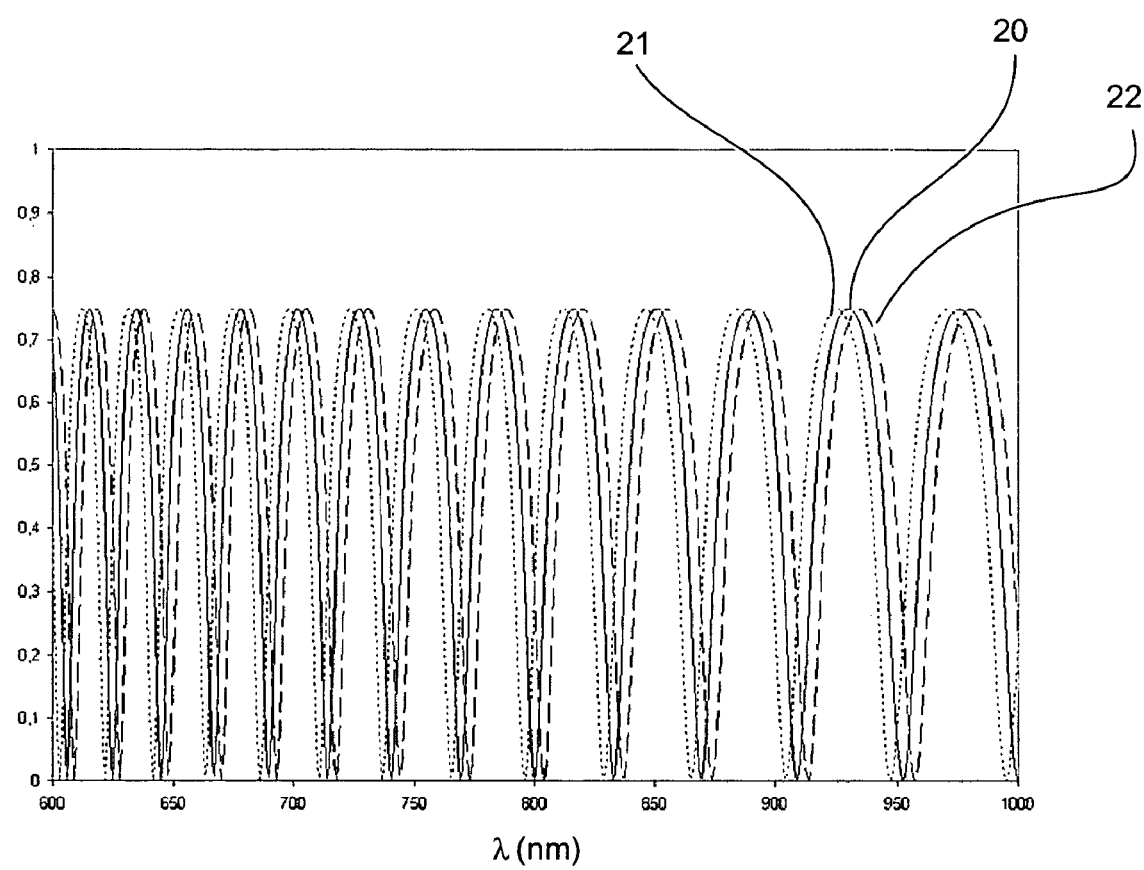
FIG. 2 is a typical reflectance spectrum of a Fabry-Perot of cavity length equal to 10 microns in accordance with the prior art.

FIG. 2 shows the reflected spectrum 20 between 600 nm and 1000 nm of a FP interferometer having a cavity length of 10 microns, and mirrors with reflectance of 30%, as calculated using equation (2). This sort of FP is said to have a low finesse. The spectrum shifts toward shorter wavelengths 21 if the FP cavity length increases, and it shifts toward longer wavelengths 22 if the FP cavity length decreases. This spectrum shifting is also accompanied with a change in the period of the spectrum modulation. The spectrum is thus unique to each cavity length, which allows univocal cavity length determination.

Figure 3:
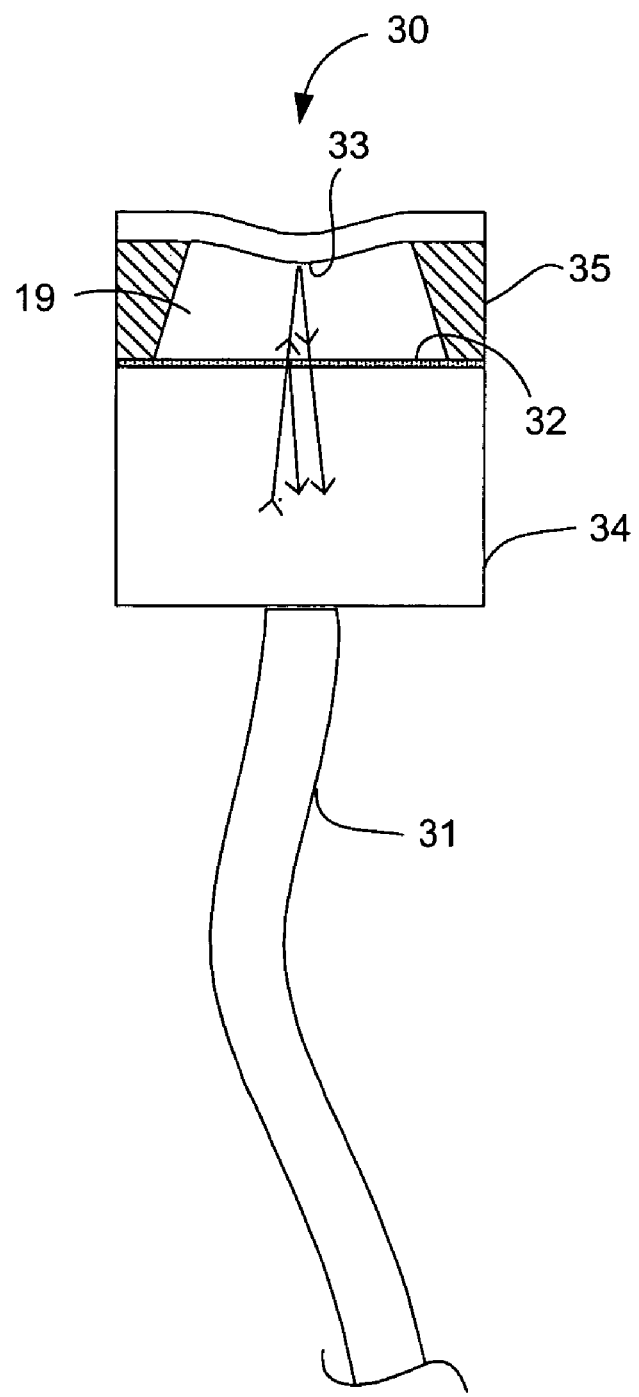
FIG. 3 is a schematic view of a fiber optic Fabry-Perot pressure sensing device in accordance with the prior art.

For the sake of better understanding what follows, FIG. 3 illustrates an existing FP sensor 30 for measuring pressure. A bi-directional optical fiber 31 guides the light signal toward the FP pressure sensor. One first partially reflective mirror 32 is deposited on the top surface of a glass substrate 34. A second deformable mirror 33 is bonded or welded to the first mirror 32 with spacers 35 therebetween mirrors 32, 33. The second mirror 33 bows toward first mirror 32 as a function of an applied pressure. FP cavity length 19 is then an unambiguous function of pressure. This is only one example of FP sensors since FP interferometers can be constructed such that the cavity length is a function of various other parameters of interest such as temperature, strain, acceleration.

The reflectance of mirrors 32, 33 can be considered constant and thus, the finesse does not change for a given FP interferometric sensor. If the refractive index n of the media filling the FP cavity 19 is also constant, which is the case of the above pressure sensor as it is filled with air or vacuum having a constant refractive index n roughly equal to 1, then the cavity length can be calculated if one knows the reflected signal R(λ,d) over a spectrum of wavelengths wide enough for univocal cavity length determination to be attainable. Such a broadband light source is also said to be a white light source. Performing FP cavity length measurement by calculating it from its reflected spectrum (or transmitted spectrum) is however not efficient. On one hand the throughput of the spectrophotometers is low since the intensity of the signal must be measured for each wavelength. The signal to noise ratio is consequently fairly low, unless the measurements are integrated over a long period. As a result of the low throughput, the refresh rate is limited to static or quasi-static measurements.

Figure 4:
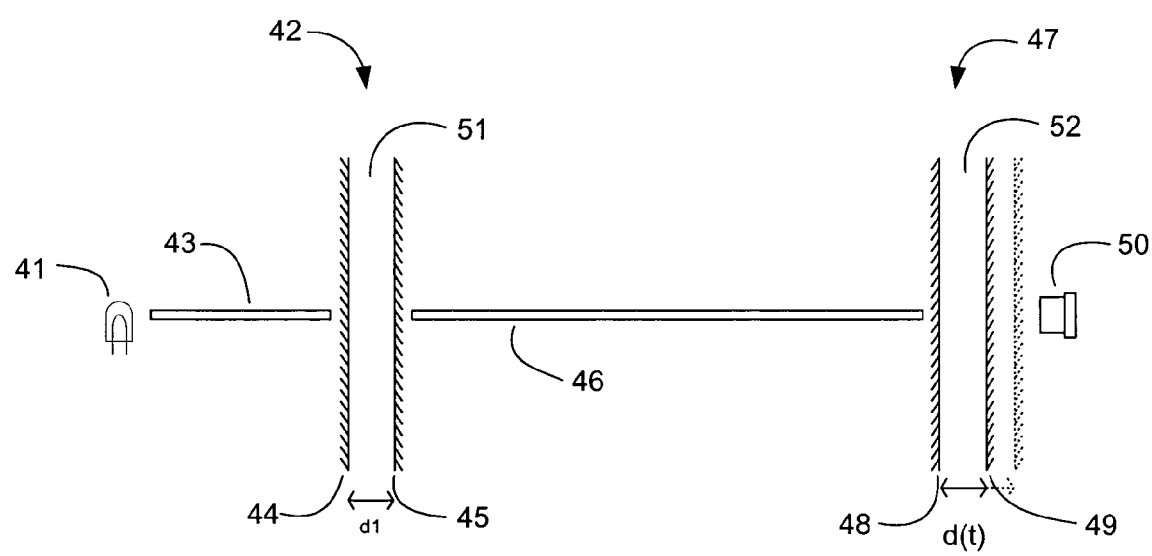
FIG. 4 is a schematic view of two interferometers configured in tandem for locally replicating the state of a remote sensing interferometer in accordance with the prior art.

Referring now to FIG. 4, there is shown a preferred construction for measuring FP cavity length. White light source 41 such as a tungsten filament lamp is directed toward a sensing FP interferometer 42, also referred as a remote interferometer, by way of a first optical fiber 43. Multiple reflections occur between the two mirrors 44, 45 of the sensing FP cavity. The light signal is intensity modulated as a function of wavelength, as given by relation (2). This encoded light signal is then captured by a second optical fiber 46 and is guided and directed toward a FP demodulating interferometer (FPDI) 47, also called a local interferometer. The encoded light signal is focused to have the focusing spot localised between the mirrors 48, 49 constituting the demodulating FP cavity. The light beam could also be collimated, but focusing is preferred since it is less sensitive to mirrors imperfections and misalignments. Focusing the beam strongly relaxes the requirements on mirrors flatness and size, which then allows the construction of smaller and less complex demodulating interferometers.

The light signal encoded by the sensing interferometer 42 and guided by the optical fiber 46 is partially reflected by the first mirror 48 of the FPDI 47. Portion of the light beam continues to be reflected by the second moving mirror 49 of said demodulating interferometer. Multiple reflections occur, with a transmission function also given by relation (2) above. The intensity of the light beam spectrally encoded by the sensing interferometer 42 and spectrally encoded again by the FPDI 47 is captured and measured by a photodetector 50. The intensity measured by the detector positioned in close proximity to the rear surface of the demodulating interferometer is given by the following relation:

$$I(d) = \int_\lambda T_{sensor}(\lambda, d_0) \cdot T_{dem}(\lambda, d) \cdot M(\lambda) \cdot d\lambda \qquad (3)$$

where:
$T_{sensor}(\lambda,d_0)$ is the transmittance of the sensor 42 for a cavity length 51 $d_0$;
$T_{dem}(\lambda,d)$ is the transmittance of the FPDI 47 for a cavity length 52 d; and
$M(\lambda)$ takes into account the light source spectrum 41, responsivity of the detector 50, and all other losses in the optical system.

Equation (3) is equivalent to the cross-correlation signal between the transmission function of the sensor 42 and the transmission of the FPDI 47. Therefore, I(d), is thereafter referred as to the cross-correlation signal at the FPDI cavity length d.

The FPDI 47 is constructed to have its cavity length 52 modulated by the application of a controllable external force that moves the second mirror 49. The FPDI 47 is scanned over a range of cavity length that is at least as large as the sensing FP cavity's total travelling range. The intensity of the light signal transmitted by these interferometers 42, 47 in tandem then corresponds to the correlation between the two signals as given by relation (3).

Let us first consider that the finesse of both sensing and demodulating interferometers is 3, corresponding to mirrors reflectance of about 35%. The cross-correlation signal I(d) is obtained by varying the cavity length d of the demodulating interferometer 47 while measuring the intensity of the light signal that is captured by the photodetector 40. The intensity as measured by the photodetector then corresponds to the correlation between the two interferometers 42, 47.

Figure 5:
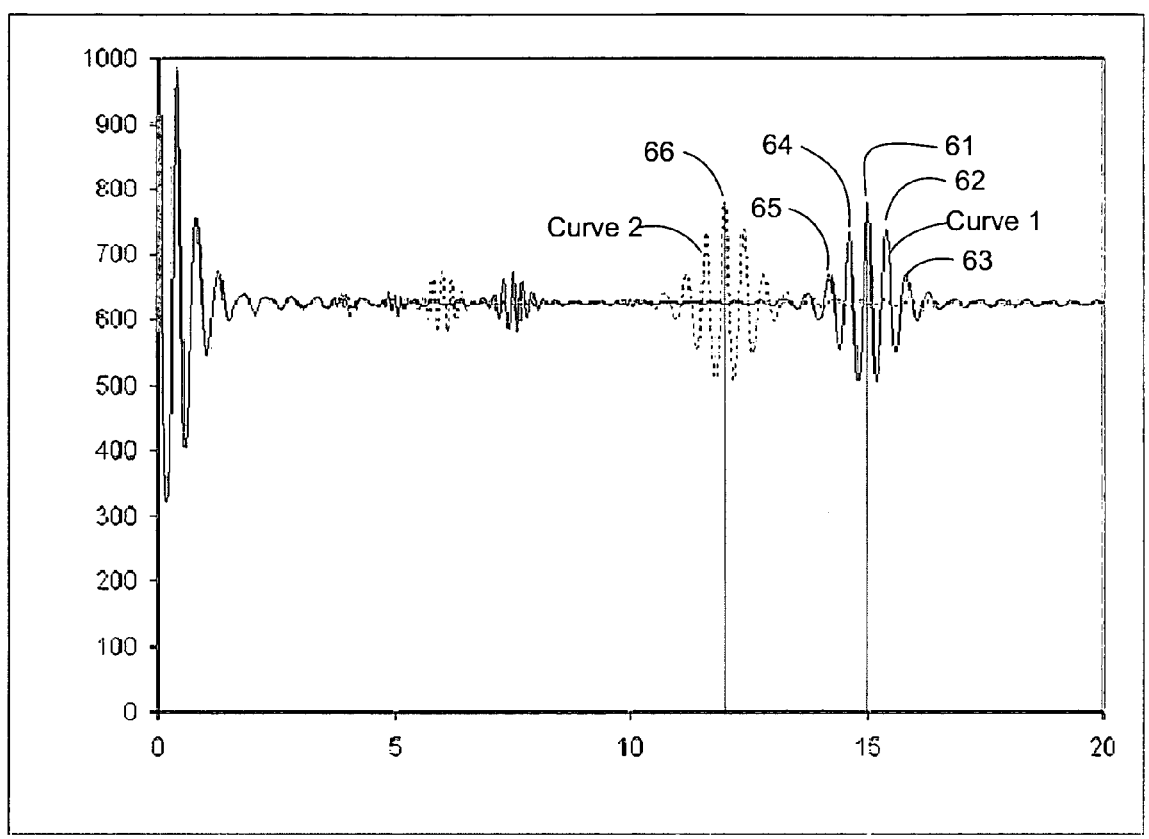
FIG. 5 shows two typical cross-correlation functions obtained with two Fabry-Perot interferometers configured in transmission in accordance with the prior art.

Curve 1 of FIG. 5 shows the cross-correlation signal I(d) as function of the FPDI cavity length d, for a sensing interferometer of 15 microns. One can see that the transmitted light signal is maximal 61 when both interferometers have equal cavity length, i.e., when the FPDI cavity length also equals 15 microns. The cross correlation at this point is said to be maximum. By varying the cavity length of the local interferometer (FPDI), one can obtain the cavity length of the remote interferometer (sensor), if the local cavity length of the FPDI is known at least at the point where the transmitted intensity is maximal. The local interferometer (FPDI) used in tandem with a remote interferometer can be said to locally replicate the remote interferometer. The position of the maximum intensity as measured by the local interferometer will move in accordance with the cavity length changes of the remote interferometer such that they track each others. Curve 2 shows the light intensity 66 for a new sensor cavity length of 14 microns.

The throughput in performing the cross-correlation between two interferometers as described above is much higher than the throughput obtained when scanning a spectrophotometer in wavelength for obtaining the spectrum of the light signal encoded by an interferometric sensor. As a result, the intensity that reaches the detector is higher and thus, the signal to noise ratio is better.

The maximum cross-correlated peak 61 being accompanied by equidistant lateral peaks 62, 63, 64, 65 of lower intensities is even more relevant. The spacing between each said correlation peaks can be approximated by the center of mass of the light source content $M(\lambda)$ as defined herein above in relation (3), divided by two. Even though the light source content $M(\lambda)$ may vary in a system due to connections, splitters, etc., the center of mass can be considered as constant. The pattern related to the cross-correlation function, i.e. the correlation peaks and envelop, moves in accordance with the sensing cavity length, but with no change of shape. If the FPDI cavity length is swept at a constant speed, for example following a triangle-like waveform, then the FPDI cavity length can be related to a time basis. It becomes clear that the cross correlation function pattern can be filtered by way of a bandpass filter centered on the cross-correlation frequency modulation. A very significant portion of the noise can thus be eliminated, which is not achievable in the case of a spectrophotometric measurement because in this last case, the pattern changes with the sensor cavity length.

The key component of the above described general method for measuring the cavity length of a remote interferometer is a FPDI. As described earlier, the FPDI must have the ability to scan its cavity length over a range at least as large as the sensing FP interferometer. By way of a non-limiting example, the cavity length of the local interferometer should typically be scanned over a range of the order of 15 µm. It is worth mentioning that this range of cavity length is significantly larger than Fabry-Perot spectrophotometers known in the art, usually scanned over a range of less than 0.5 µm. The finesse of such a FPDI is preferably of the order of 2, compared to about 100 or 1000 for prior art Fabry-Perot spectrophotometers. This strongly relaxes the tolerance on the parallelism of the mirrors constituting the FPDI. It allows for the second mirror to bow even for small diaphragm, thus simplifying the production and operation of the FPDI. The following will describe embodiments of the invention that meet these criteria.

First Embodiment of the Present Invention

Figure 6:
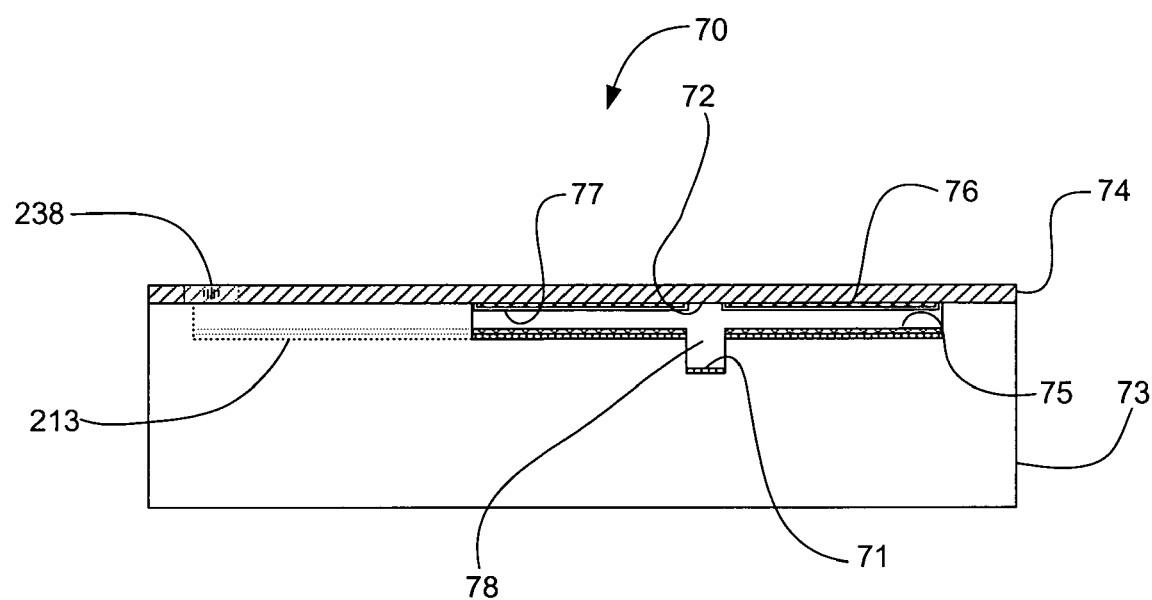
FIG. 6 is a cross-sectional view of a MEMS Fabry-Perot demodulating interferometer actuated with an electrostatic force in accordance with a first embodiment of the present invention.

FIG. 6 shows a first embodiment 70 of a micro-electromechanical (MEMS) Fabry-Perot demodulating interferometer (MEMS-FPDI) based on the use of silicon micromachining techniques. It comprises a low finesse FP interferometer with a first mirror 71 made by depositing a semi-reflective mirror on the inner surface of a glass substrate 73, and a second mirror 72 made of the inner surface of a silicon diaphragm 74. The second mirror 72 made of said inner surface of the silicon diaphragm can be scanned by applying a voltage between the two electrodes 75, 76, the first electrode 75 being made by depositing a first metal layer on the glass substrate, and the second electrode 76 being made by depositing a second metal layer on the silicon diaphragm. The distance between the two mirrors, and hence the FP cavity length 78, is monitored by measuring the capacitance between said electrodes 75, 76. A layer of $SiO_2$ 77 is deposited so as to fully cover the surface of the second electrode 76, thus preventing both electrodes 75, 76 from coming into electrical contact.

The electrostatic pulling force acting on two flat electrodes is given by relation (4) below.

$$F = \frac{V^2 \varepsilon A}{2z^2} \qquad (4)$$

where
V is the voltage between the two electrodes;
$\varepsilon$ is the permittivity of the media there between the electrodes;
A is the surface of the electrodes;
z is the distance separating the electrodes.

It can be seen from relation (4) that the pulling force decreases very rapidly with the separating distance z between the electrodes. It is therefore preferable to keep this distance as small as possible.

Since the FP cavity needs to be scanned from 10 µm to 25 µm, never below 10 µm, there is provided a small recess in the center of the glass substrate such that the FP cavity length is always larger than the distance separating the electrodes, minimizing the electrodes' separation and thus maximizing the pulling force.

By way of non-limiting example, there is provided hereinafter a method shown in FIG. 7 for the production of a the FPDI of the first embodiment 70, along with a more detailed description of its functionality. In order to reduce the cost of the FPDI a plurality of FPDI's are produced simultaneously on the same substrate.

Fabrication of the MEMS FDPI of the First Embodiment:

The fabrication of FPDI first embodiment 70 starts with a glass substrate 73, a 7740 glass Pyrex 0.5 mm thick and 100 mm of diameter. The surface of the glass substrate is coated with a layer of chrome 201 500 Angstroms thick using a conventional vacuum deposition system. This chrome layer will be used as a mask for etching the glass substrate 73 according to the desired pattern. A photoresist 202 is then spin coated on the chromium mask layer 201, after which the spun coated glass is baked at 90° C. in an oven for 1 hour. The photoresist 202 is exposed in a mask aligner, with a mask having circular opening 100 µm in diameter, for example.

After being exposed, the photoresist is developed, and the glass substrate is left with circular unprotected chrome opening. The unprotected chrome is etched with a chrome etch solution composed of one part of HCL and one part of glycerine. The glass substrate with the 100 µm circular exposed surface is immersed into a buffered HF solution composed of four parts of a mixture of 3 ml of water and 2 g of $NH_4F$ plus 1 part of 48% HF solution. The glass substrate is etched down to a depth of 10 microns, providing first hollow recessed cavity 203. The photoresist 202 and the chromium layers 201 are removed for further substrate processing.

The substrate is recoated with a new layer of chrome 211, and spin coated with a photoresist 212. The photoresist is patterned with a mask having circular opening 6 mm in diameter centered with the first hollow recessed cavity 203, then defining the second hollow recessed cavity 214 where the diaphragm is allowed to bow inward. In addition to the circular opening, there is provided a channel 213, also shown in FIG. 8 thus submitting both surfaces of the diaphragm to the same atmospheric pressure. Upon diaphragm deflection, air is allowed to flow in and out of the cavity through the channel, which reduces the restriction of the diaphragm movement. As it will be further described later, the same channel will also serve for connecting the first electrode 75 to the first pad 222 without contacting with the silicon substrate. The second hollow recessed cavity 214 and channel 213 are etched down to a depth of 15 µm, which in turn further etches the first hollow recessed cavity 203 to a total depth of 25 µm.

This etching depth is well suited if the deflecting diaphragm is statically tuned. Static tuning means that the diaphragm can be maintained at a given deflected position with the application of an electrostatic force. The deflection of the diaphragm is however limited in this case to a maximum deflection of about 5 µm for a diaphragm 25 µm thick, after which the diaphragm undergoes the well known electrostatic actuating phenomenon called "snap through instability", instantaneously deflecting the diaphragm all the way to the bottom of the second hollow recessed cavity 214. The pull-in voltage needed to bring the above described silicon diaphragm to its snap through instability position is of the order of 150 Volts.

An alternative to the above is to operate the diaphragm in the dynamic mode. The voltage can be significantly lowered by operating the diaphragm at its natural frequency which is of the order of 8 kHz for this specific design. If the diaphragm is excited at its natural frequency, then it also moves outward of the surface, then covering twice the range of FP cavity length. It is thus possible to etch the cavity to a depth corresponding to half the desired traveling range, while still covering the desired total range of the FP cavity length. The voltage required to make the diaphragm oscillates over the desired range is consequently further lowered because the damping ratio is low. In this first embodiment 70, the second hollow recessed cavity 214 is etched to a depth of 8 µm, which in turn further etches the first cavity 203 to a depth of 18 µm. The voltage required to reach the snap through instability is reduced to 60 Volts in this case. While oscillating from say 7.5 µm. inward the glass substrate to 7.5 µm. outward the glass substrate, the voltage required for sustaining this excursion is further reduced as a result of the gain encountered at the natural oscillating frequency.

Prior to the removal of the mask that patterned the above said second hollow recessed cavity 214 and channel 213, a semi reflective mirror 71 is deposited in the bottom of first 203 and second 214 hollow recessed cavities, and channel 213, so as to increase the reflectance of the first mirror to about 35% and thus, obtain the desired finesse. The optical thickness of the partly reflective coating is given by the center of the wavelength spectrum $M(\lambda)$ divided by 4 ($\lambda/4$). To obtain the desired reflectance, the refractive index of the dielectric layer should be of the order of 2. By way of non-limiting example, $ZrO_2$ and $Ta_2O_5$ are well suited materials. Methods for depositing such materials are well known for those skilled in the art.

Figure 8:
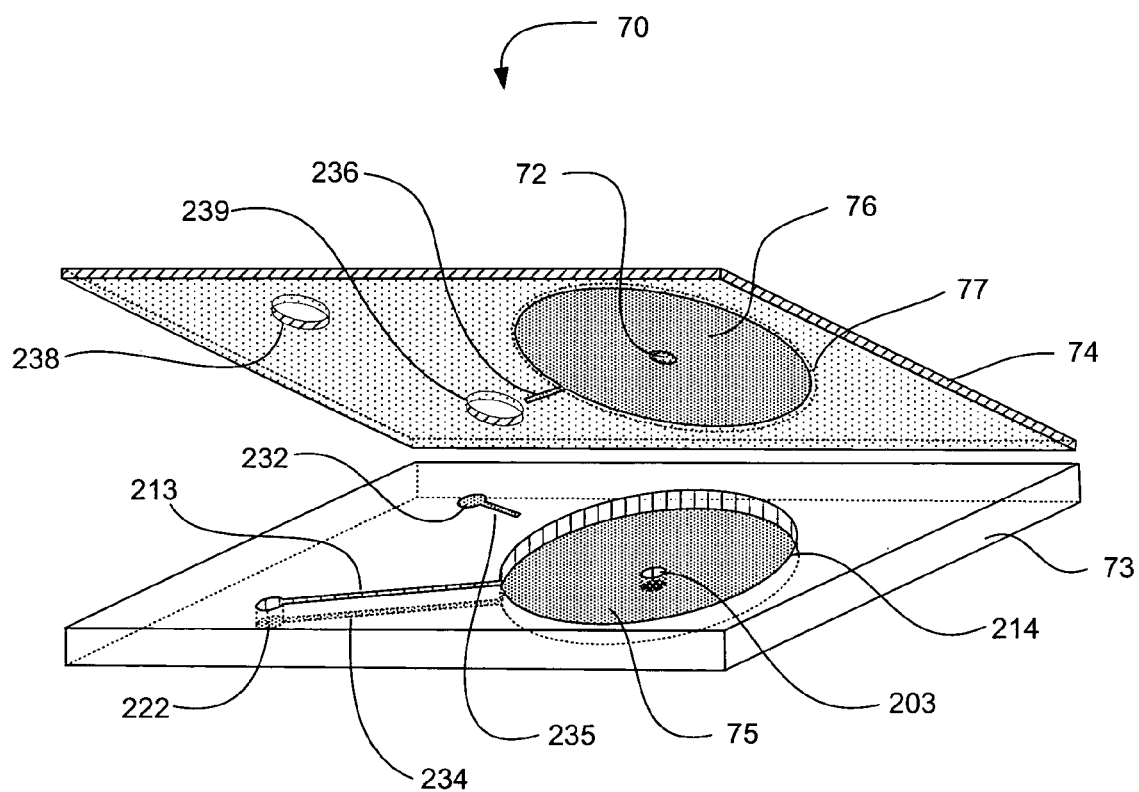
FIG. 8 is an internal perspective view of the MEMS Fabry-Perot demodulating interferometer of FIG. 6.

Another spin coated photoresist 221 is patterned for depositing the metal layer forming the first electrode 75, the contact pads 222, 232, the first connecting trace 234 and the first portion of the second connecting trace 235, as shown in FIG. 8. The portion of the mask for making the first electrode 75 has the form of a donut, with an inner diameter of 100 µm. and an outer diameter just slightly smaller than 6 mm. The center of the donut is used to protect the first hollow recessed cavity 203 with a partly reflective mirror 71 in its bottom from being covered with the metal layer to be deposited. Once the photoresist is patterned, a layer of chrome is deposited for improving the adhesion of the second conductive layer. A layer of gold is then coated for forming the first electrode 75, pads 222, 232 and connecting traces 234, 235.

Although the contact method is not critical to the actual invention, one such method is presented by way of non-limiting example. The first electrode 75 connects to the first pad 222 by way of the first connecting trace 234. Being deposited in the bottom of the channel 213, the first connecting trace 234 do not contact with the silicon substrate. The second contact pad 232 and the first section of the second connecting trace 235 are deposited simultaneously with first electrode 75, on the surface of the first glass substrate 73. The second portion of the second connecting trace 236 will overlap the first section of the second connecting trace 235 and thus, they will connect together upon joining the diaphragm section 242 to the glass substrate section 241. As will be discussed later, the silicon diaphragm will be etched above the contact pads 238, 239 prior to anodically bonding both sections 241, 242, then allowing getting access to the contact pads 222, 232.

The fabrication of the diaphragm section 242 starts with a silicon substrate 74 25 μm. thick, for example. As now shown in FIG. 7, the silicon substrate is temporarily bonded to another thicker silicon or glass substrate 251, hereinafter called the temporary handle, with a low melting temperature wax, for example. Bonding the silicon substrate 74 to another thick substrate 251 reduces risks of damaging the silicon substrate during processing. The top surface of the silicon substrate is coated with a layer of chrome 253 followed by a spin coated layer of photoresist 254. The photoresist 254 is patterned for forming the openings 238, 239 needed to get access to the pads 222, 232 as shown by FIG. 8. The chrome 74 is etched to expose the silicon. The silicon substrate is etched through in the openings by immersing the substrate into a bath of isotropic HNA etching solution composed of 2 parts of 48% HF, 15 parts of 70% $HNO_3$, and 5 parts of $CH_3COOH$. The photoresist 253 and chrome layers 254 are removed. The second electrode 76 is then patterned with a photoresist 244 with a donut-like outer diameter equal to 6 mm, and an inner diameter equal to 100 μm. The second portion of the second connecting trace 236 is also patterned. A layer of chrome is deposited, followed by the deposition of a gold conductive layer. The photoresist 244 is removed again.

Prior to patterning the pads and electrode as described above, it is possible to integrate a photovoltaic detector positioned in the center of each diaphragm for measuring the intensity of light, which intensity corresponds to the cross-correlated signal. A material of opposite type must be diffused or implanted in the diaphragm for forming the active region known as a p-n junction. The photovoltaic device can also be formed by methods other than p-n junction, including a p-i-n diode or a metal semi-conductor junction. By connecting to the active region and to the rear side of the diaphragm by way of an ohmic contact, the electric current that flows there between the contacts is proportional to the light intensity.

Another photoresist 246 is patterned just slightly larger than the second electrode 76 without the second portion of the second connecting 236 trace. 5000 Angstroms or more of $SiO_2$ is then deposited 77 to fully cover and thus electrically isolating the second electrode 76 from the first electrode 75. The isolation will prevent said electrodes from contacting each others during the anodic bonding process that will be used to join both the upper 242 and lower 241 sections of the FPDI, while preventing the same when in use. The diaphragm 74 is then separated from the temporary handle 251 by immersing it into a bath of acetone.

The uncoated center 72 of the silicon diaphragm will serve as the second mirror of the Fabry-Perot interferometer. No additional coating is required to increase the reflectance of the silicon diaphragm since the refractive index is of the order of 3.5, giving rise to a Fresnel reflection of about 35%.

Finally, the finished diaphragm section 248 and glass substrate section 249 are aligned and anodically bonded. Anodic bonding mechanism is well known to those skilled in the art and therefore, it will not be described here. Bonding temperature is nevertheless a critical factor for the fabrication of the FPDI devices. Upon cooling down to operating temperature, the residual stresses in the diaphragm must be in tension so as to avoid any diaphragm buckling. Bonding the silicon diaphragm section to the 7740 Pyrex glass substrate section at a temperature of 550° C. will assure positive stresses in the diaphragm upon cooling down, therefore avoiding any buckling phenomenon.

The completed FPDI devices 70 are singled out by dicing the wafer with a dicing saw.

The above described thin silicon diaphragm is difficult to manipulate and may be broken during processing. Another fabrication method of the silicon diaphragm may consists in using a thick undoped silicon substrate of 0.5 mm, for example, with an etch stop layer of the desired thickness, 25 μm. in this specific case, for constituting the diaphragm. The etch stop can be obtained by epitaxially growing 25 μm of heavily boron doped silicon ($>10^{20}$ $^{cm-3}$) For thinner diaphragm, boron could also be diffused into the silicon substrate. The surface of the etch stop layer is processed as described above for etching the openings giving access to the contact pads, as well as for depositing metal layers for obtaining the second electrode and the second portion of the second connecting trace.

The patterned surface of the etch stop silicon diaphragm is aligned with the glass substrate, and anodically bonded. In the previous case, the temporary handle was removed prior to anodically bonding the silicone substrate to the glass substrate. In this case, the undoped portion of the silicone substrate is removed after being bonded to the glass substrate. The silicon diaphragm is mechanically grinded to reduce its thickness down to about 75 μm. The remaining undoped silicon is etched with a solution of ethylene diamine pyrocathechol (EDP) until it reaches the etch stop layer constituting the diaphragm, where the etching process stops. EDP is composed of 8 ml of water, 17 ml of ethylenediamine, and 3 g of pyrocathechol. Various other methods for the production of the diaphragm can be put into practice, such as using multi steps etch stop layers for obtaining a smoother surface, electrochemical etching of a p-type silicon substrate on which an epitaxial n-type silicon layer is grown, or other similar practices known by those skilled in the art.

The above described first embodiment 70 comprises a low finesse FPDI cavity 78 and a pair of electrodes 75, 76. The use of the electrodes is twofold: on one hand they are used to create an electrostatic attractive force that moves the diaphragm toward the glass substrate, therefore modulating the Fabry-Perot cavity length; on the other hand they are used to monitor the distance between the same electrodes, and therefore the distance between the Fabry-Perot mirrors, by assessing the capacitance there between said electrodes. Other methods can be used to measure the distance between the mirrors constituting the Fabry-Perot interferometer of the FPDI. Piezo-resistors can be diffused or epitaxially grown on the surface of the deflecting diaphragm, thus monitoring the stress in the diaphragm. The piezo-resistors can be positioned on the surface of the diaphragm such that the measured stress is related to its deflection. Piezo-resistors are preferably used in combination with the capacitance, the later providing the absolute distance between the mirrors while the piezo-resistors are used to track rapid movements of the diaphragm relative to an absolute position provided by the capacitance measurement. According to a pre-determined scheme, the capacitance is used to re-initialize the cavity length measured by the piezo-resistors, therefore obtaining absolute cavity length measurements. Piezo-resistors can be obtained by diffusing boron or by epitaxial layer, methods well known by those skilled in the art. Piezo-resistors can also be replaced by other non-contact proximity detectors for performing the same function.

In order to perform accurate FPDI cavity length measurements, it is recommended to sample the position of the diaphragm of the FPDI at a rate of 2000 samples per scanning period. Considering that the natural frequency of the above described FPDI is 8000 Hz, the sampling rate is therefore fairly high (8000×2000=16 Msamples/sec). It is desirable to reduce the natural frequency so that the sampling rate could proportionally be reduced. The next embodiment presents another diaphragm configuration which has a lower natural oscillation frequency.

Second Embodiment of the Present Invention

Figure 9:
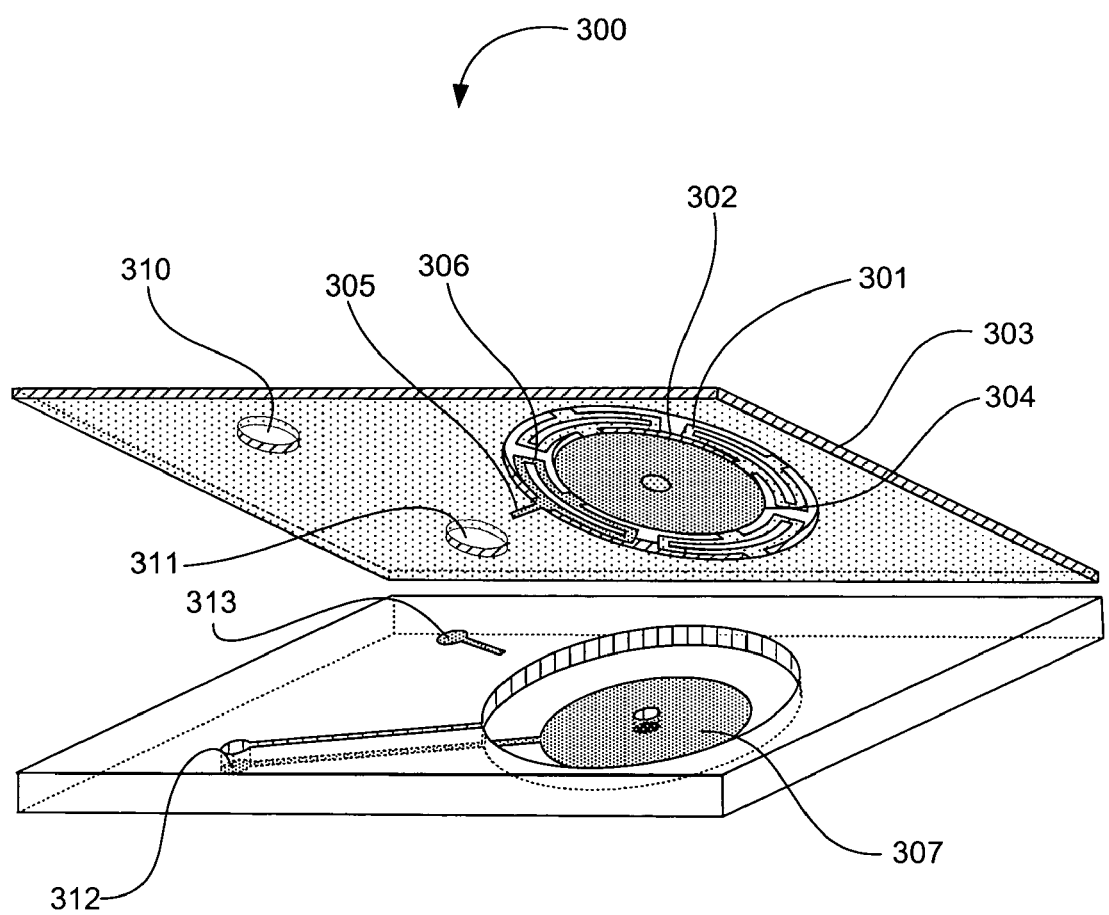
FIG. 9 is an internal perspective view of a MEMS Fabry-Perot demodulating interferometer in accordance with a second embodiment of the present invention, the diaphragm being connected to tethers.

A second preferred embodiment 300 involves the use of four tethers 301 connecting the diaphragm 302 to the silicon substrate 303. FIG. 9 illustrates the internal view of such a diaphragm connected to the silicon substrate with tethers. The natural frequency of such an embodiment can be reduced to 1000 Hz and lower, while also reducing the voltage required to deflect the diaphragm. One method to construct this tether diaphragm is provided herein after.

A thin silicon diaphragm 303 25 μm thick is temporarily bonded on a glass substrate (handle). The surface of the silicon diaphragm is coated with chrome and with a photoresist. The photoresist and the chrome layers are patterned to etch through the silicon so that all four tethers 301, the center of the diaphragm 302 and the openings 310, 311 for the connecting pads 312, 313 are formed. The total diameter of the diaphragm and tethers is still 6 mm, but the center of the diaphragm 302 is reduced to 4 mm, for example. The chrome and photoresist are then removed. Another layer of photoresist is coated and patterned to form the second electrode 304 and the second portion of the second connecting trace 305. The second electrode 304 is deposited on the central portion of the diaphragm 302. The second portion of the second connecting trace 305 follows the arms of one tether 306. The second electrode 304 and all four tethers are then electrically isolated from the first electrode by depositing a layer of $SiO_2$. The fabrication of the diaphragm section is therefore very similar to the fabrication of the diaphragm of the first embodiment 70. For the glass substrate fabrication, it is the same as for said first embodiment 70, except that the first electrode 307 is also reduced to 4 mm for facing the second electrode 304. The patterned silicon substrate is anodically bonded to the glass substrate, and diced in single FPDI devices.

It is understood that alternative constructions for the second FPDI embodiment 300 with other design and form of tethers are within the scope of the invention. Similarly, the natural frequency can be further lowered by providing a rigid silicon center for increasing the mass of the diaphragm, therefore reducing the natural frequency.

Third Embodiment of the Present Invention

Figure 10:
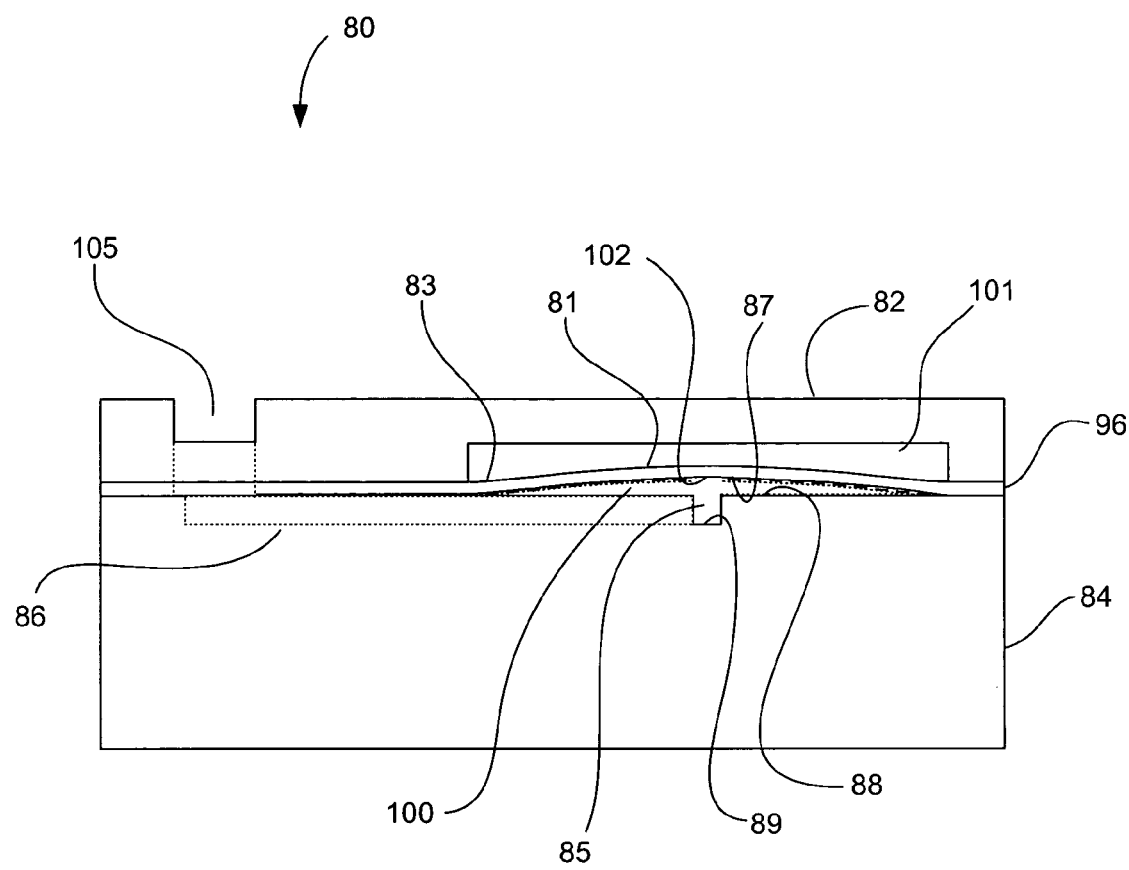
FIG. 10 is a cross-sectional view of a MEMS Fabry-Perot demodulating interferometer having a pre-shaped deflectable diaphragm in accordance with a third embodiment of the present invention.

A third preferred embodiment 80 for reducing the actuation voltage while reducing the size of the diaphragm is described herein after. The third preferred embodiment 80 for the construction of a FPDI is shown in FIG. 10, where the diaphragm 81 is pulled toward the glass cover 82 with a Ziploc-like motion. According to relation (4), the force becomes extremely high when the electrodes 87, 88 are in very close proximity. It is then desirable to bring the electrodes in closer proximity, or at least a portion of the same. The edge of the diaphragm 83 is initially in very close proximity with the glass substrate 84. By applying a voltage, a large electric field is created near the edge 83 of the diaphragm 81, where the separation between the electrodes 87, 88 is minimal. The resulting force is then very high, pulling the edge of the diaphragm 83 in close contact with the substrate. A larger force is subsequently induced toward the center of the diaphragm, as it comes in closer proximity with the substrate. This phenomenon continues until the diaphragm is in full contact with the substrate. This works like a sustained reaction, where a very small voltage can pull the whole diaphragm through the total travelling range. But in order to be effective, the initial shape of the diaphragm is very important. The edge of the diaphragm should hopefully be nearly tangential with the surface of the glass. A cavity of the desired shape could be etched in the glass substrate or in the glass cover with the desired shape. However, it is believed that the cost and yield of such an etching process would be prohibitive with the actual art. The preferred embodiment of FIG. 10 rather benefits from the natural shape of a deflected diaphragm that results from the application of a differential pressure.

Fabrication of the MEMS FPDI of the Third Embodiment

Figure 11:
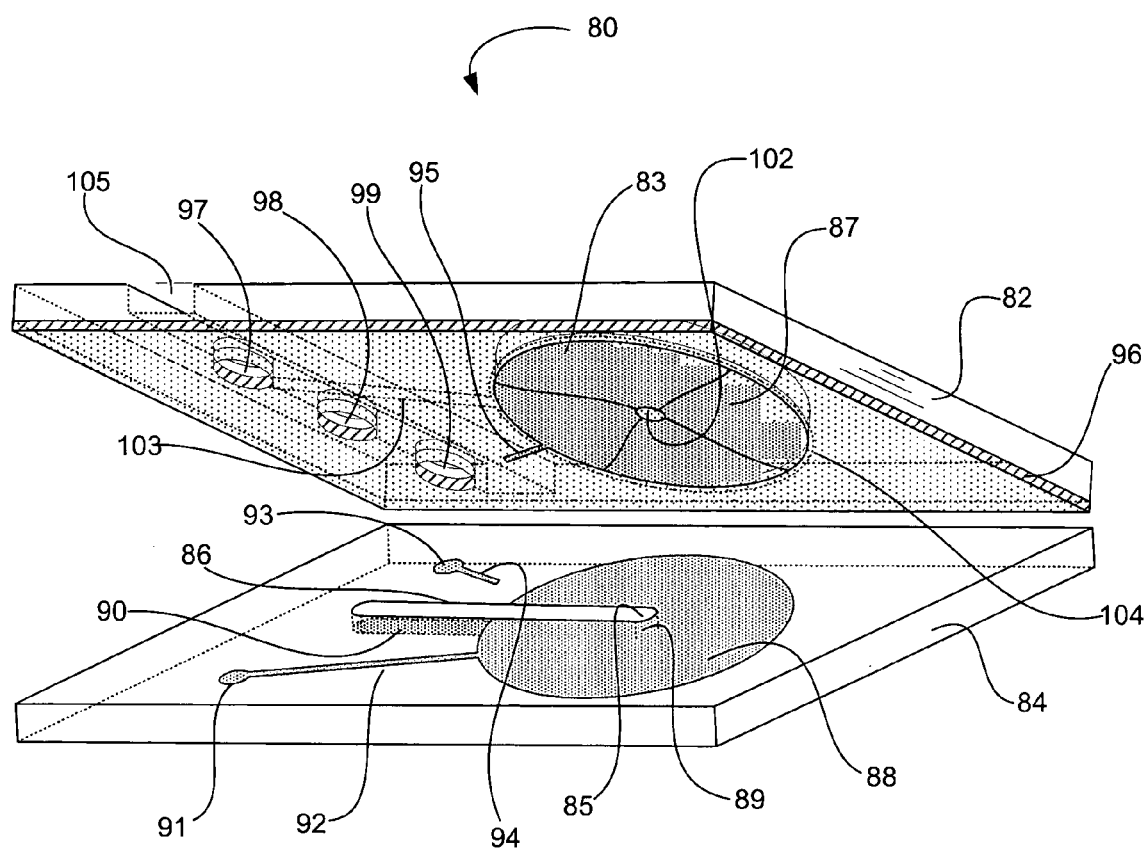
FIG. 11 is an internal perspective view of the MEMS Fabry-Perot demodulating interferometer of FIG. 10.

By way of non-limiting example, the construction and the fabrication process of said third embodiment 80 is further detailed hereinafter. FIG. 10 shows a section of the lateral view of the FPDI and FIG. 11 shows a perpective internal view of the FPDI prior to its final assembly.

The starting point is, for example, a 7740 Pyrex glass substrate 84 0.5 mm thick and 100 mm in diameter. The first glass substrate 84 is masked by first depositing a layer of chromium 400 Angstroms thick. A photoresist is then spin coated on top of the chromium coating. The substrate is then exposed with a mask for providing the opening for the first hollow recessed cavity 85 and air channel 86. The first hollow recessed cavity 85 served for determining the Fabry-Perot cavity length upon full diaphragm deflection. The said first hollow recess 85 is circular and preferably 100 μm in diameter. A channel 86 is also provided from the central recessed cavity 85 to a first releasing volume 98. This channel 86 will allow for the atmospheric pressure to reach the volume 106 there between the electrodes 87, 88. Upon diaphragm deflection, the air pressure could partially be evacuated through said air channel. After being exposed with the patterned mask described herein before, the photoresist is developed. The substrate is then immersed into a chromium etching solution to remove the exposed chromium still in the patterned opening. The glass substrate is then immersed into a buffered HF solution. The substrate is kept in the etching solution until the cavity is etched to a depth of 10 μm, for example. Following the etching, a partly reflective mirror 89 is finally deposited in the bottom of the etched cavity 90, prior to the removal of the remaining photoresist and chromium. The dielectric coating, used to increase the reflectance to about 35%, is a quarter wavelength layer of $ZrO_2$, $Ta_2O_5$ or the like. The photoresist and chromium layers can now be removed for further processing.

The first glass substrate 84 is recoated, but with a photoresist only, for patterning the first electrode 88. This electrode must be of the same diameter as the diaphragm 81. Once the photoresist is developed with the desired pattern, a layer of 400 Angstroms of chromium is deposited. The chromium provides a good adhesion surface for the subsequent layer. A layer of 400 Angstroms of gold is then deposited, thus forming the first electrode 88.

The electrode must be connected to a contact pad that will serve to apply a voltage. The electrode can be connected vertically by way of an electrical feed through, or horizontally with a trace going apart from the cavity. Although the contact method is not critical to the actual invention, one method will be presented by way of non-limiting example.

FIG. 11 reveals the internal view of the FPDI with the electrodes, the connecting traces and the contact pads. The first electrode 88, the first contact pad 91 and the first connecting trace 92 are deposited on the surface of the first glass substrate 84. The second contact pad 93 and the first section of the second trace connecting 94 are also deposited, simultaneously with first electrode 88, on the surface of the first glass substrate 84. The second portion of the second connecting trace 95 overlaps the first section 94 and thus they will connect upon joining them together. As will be discussed later, the silicon substrate 96 and the glass cover 82 are etched above the contact pads 91, 93 and above the end of the channel 86 prior to second anodic bonding, which will then allow getting access to said contact pads and allow for the air to flow in and out of the volume 106 there between the electrodes 87, 88.

The construction of the other portion of this FPDI starts with a second 7740 glass substrate similar to the first glass substrate. This second glass substrate will serve as the glass cover 82. This glass cover is first masked with a layer of chromium and a layer of photoresist the same way as for the first glass substrate. The photoresist is then exposed to provide a pattern that will determine the size and the shape of the diaphragms 81. The center of this diaphragm 81 must be centered and aligned with the first hollow recess 85 provided in the first glass substrate 84 that forms the Fabry-Perot interferometer. The diaphragm is preferably circular with a diameter of 1.5 mm, for example. The second hollow recess cavity 101 is etched with a buffered HF solution to a depth of 250 m or more. Simultaneously with the above, the glass cover 82 will be etched above the contact pads 91, 93 to form releasing volumes 97, 99 for the contact pads, and above the end of the air channel 86 to form the releasing volume 98.

Figure 12:
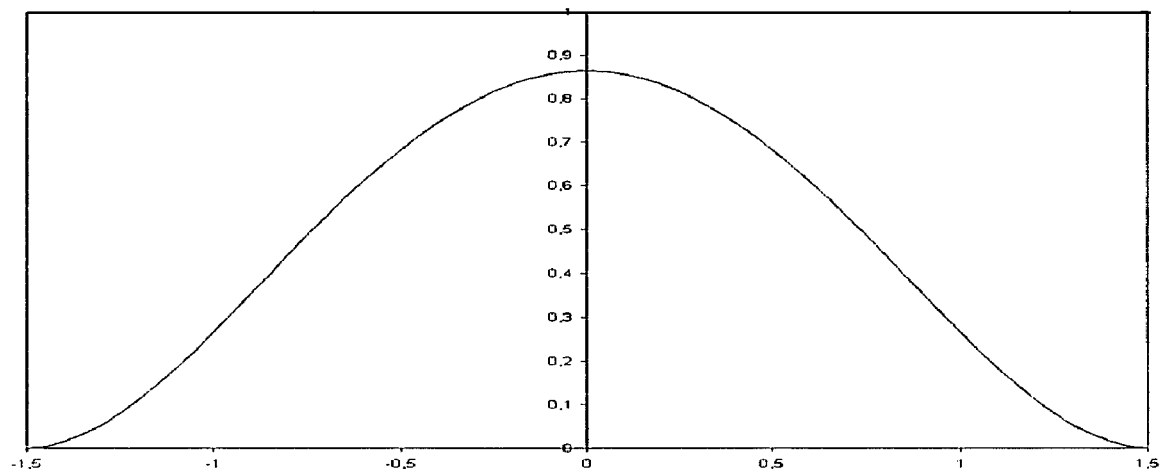
FIG. 12 is a graph illustrating the shape of a diaphragm of the MEMS Fabry-Perot demodulating interferometer of FIG. 10, biased with the application of a differential pressure.

A thin silicon wafer 96 10 μm thick is anodically bonded to the previously etched side of the glass cover 82. This silicon wafer will form the diaphragm 81 deflecting in the volume provided by the second hollow recess 101 in the glass cover 82. For the silicon diaphragm to bow inside the recess at rest, the first anodic bonding is performed under vacuum. The volume 106 between the electrodes being at atmospheric pressure, the pressure differential will push on the diaphragm 81, thus deflecting toward the glass cover. The resulting shape of the diaphragm is shown in FIG. 12. It can be seen that the surface near the edge is nearly tangential to the first glass substrate as desired.

As described above for the first embodiment, the diaphragm can also be made by way of an etch stop silicon layer grown or diffused on one surface of an undoped silicon substrate.

Once the silicon substrate 96 of the desired thickness is obtained, said silicon substrate that covers the pads releasing volumes 97, 99 and air channel releasing volume 98 must be etched away. Chromium and photoresist layers are deposited on the surface of the silicon. The silicone areas above the releasing volumes 97, 98, 99 are etched through with an isotropic HNA etching solution composed of 2 parts of 48% HF, 15 parts of 70% $HNO_3$, and 5 parts of $CH_3COOH$. The photoresist and chromium remaining layers are then removed. By way of the masking technique described above for the first electrode 88, the second electrode 87 is patterned so that the central section 102 of the electrode and the second connecting trace 95 are provided. Similarly to the first electrode, the second electrode is made like a donut, with an inner diameter of 100 microns and an outer diameter of 1.5 mm.

In order to prevent the electrodes 87, 88 from contacting each others during the second anodic bonding process that will be used to join both the upper and lower sections of the FPDI, and to prevent the same when in use, electrical isolation must be provided there between the electrodes. Another photoresist mask just slightly larger than the previous one used to form the second electrode is provided. The photoresist is also opened 103 right above and slightly larger than the first connecting trace so that said connecting trace do not contact with the silicon substrate which may be conductive if it is doped. 5000 Angstroms or more of $SiO_2$ is then deposited 103, 104 to fully cover and isolate the second electrode.

After removing the photoresist, the upper and lower sections are ready for being anodically bonded. Both sections of the FPDI are aligned and anodically bonded under atmospheric pressure.

The completed wafer is now ready for being diced. Dicing will consists of first grinding 105 the glass cover above the contact pads to get access to them, followed by dicing the FPDI in individual devices.

Fourth Embodiment of the Present Invention

It has been shown that the MEMS device 80 described previously has the capability to pull down a surface over a large displacement range by generating a large force. More important is the fact that the pulling force is generated by an electrostatic field induced by a very low voltage.

A MEMS 401 similar to the MEMS 80, thus comprising the special shaped diaphragm 81, could also be advantageously used in other configurations then optical configurations.

Figure 19:
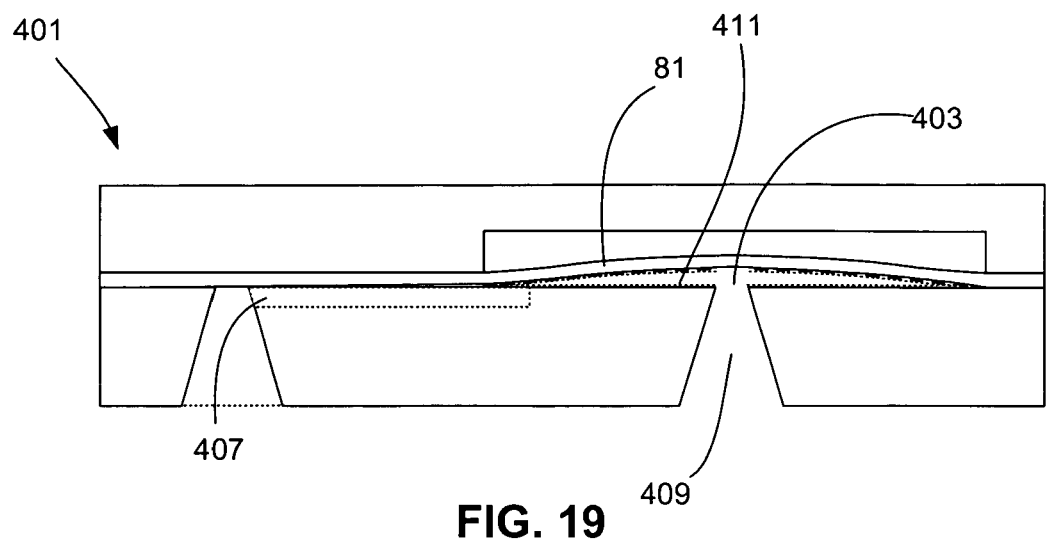
FIG. 19 is a cross-sectional view of a MEMS ink projector in accordance with a seventh embodiment of the present invention.
Figure 20:
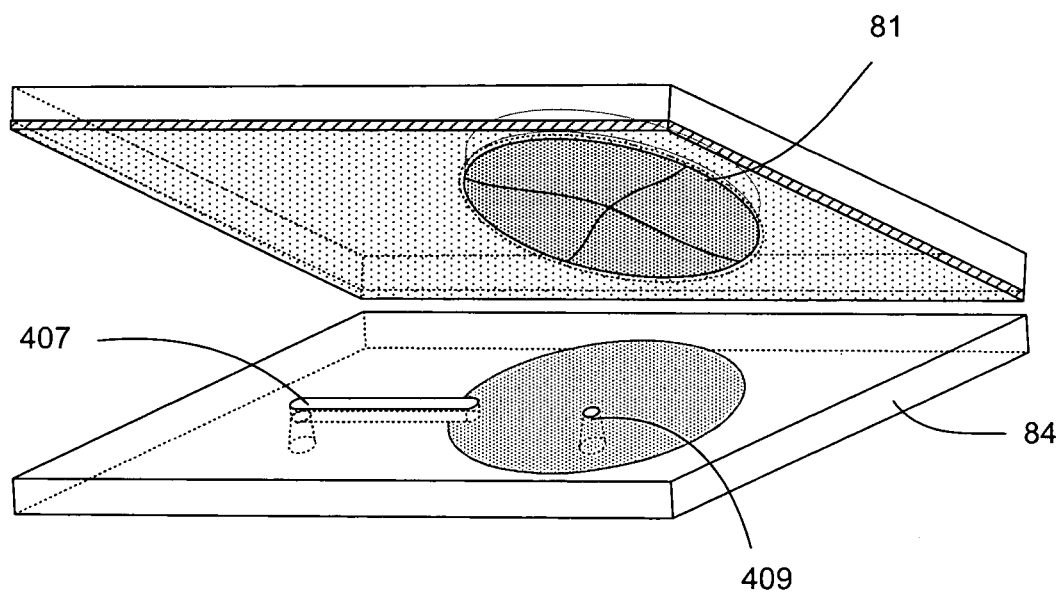
FIG. 20 is an internal perspective view of the MEMS ink projector of FIG. 19.

For example, as illustrated in FIG. 19 and FIG. 20, such a MEMS 401 could be used to pump a liquid or to control the flow of any substance passing by the open cavity 403 formed by the diaphragm 81 and the substrate 84. In the MEMS 401 shown in FIG. 19 and 20, a internal MEMS volume 411 is formed by the junction of an input channel 407 and output channel 409 that are connected to the cavity 403. The special shaped diaphragm 81 serves as a valve: by changing its shape, the cavity 403 volume is varied, as is, in the same time, the internal MEMS volume 411 formed by the junction.

A possible application of such a MEMS 401 is an ink injection system. A pressurized ink reservoir could be linked to the input channel 407 and the special shaped diaphragm 81, as it is deflected, projects the ink out of the MEMS 401 through the output channel 409, This embodiment of the present invention provides for a MEMS 401 with an internal volume 411 having a variable volume. Naturally, as it will be obvious for someone skilled in the art, other internal volume configurations could also be used without departing form the scope of the present invention. For example, the input channel 407 could open on the diaphragm side of the MEMS 401 instead of having an opening on the substrate side of the MEMS 401.

Naturally, it is also possible to combine, in the same MEMS, a FP cavity to a MEMS internal volume 411 having a variable volume. For example, such a FP MEMS could have an output channel 409 which is slightly offset from the FP cavity axis to clear the light passage in the FP cavity.

As it will be appreciated by someone skilled in the art, many different internal volume configurations, combining or not to a FP cavity, can be used to create a MEMS 401 with an internal volume 411 having a variable volume that can be controlled by deflecting the special shaped diaphragm 81.

Also, as it will be appreciated by someone skilled in the art, the shape of the diaphragm 81 could be simply modified by changing the pressure difference existing between one side of the diaphragm and the other side. Therefore, by controlling this pressure difference, one can control the shape of the diaphragm 81 and also control the volume of the cavity.

Fifth Embodiment of the Present Invention

Now that the construction and production process of a first 70, second 300, third 80, and fourth 401 preferred embodiments have been described herein before, we will describe a method for putting similar FPDI devices into practice.

Figure 13A:
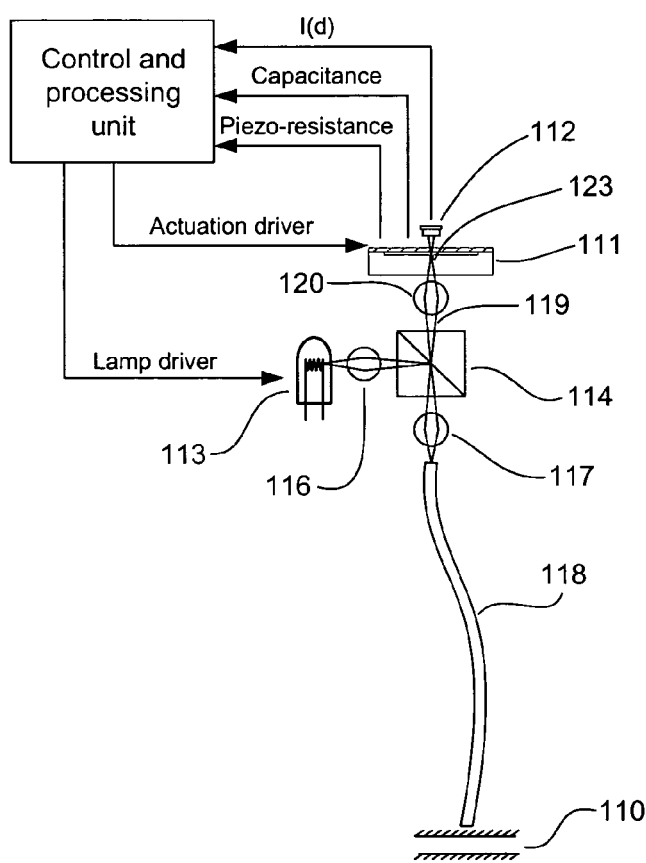
FIG. 13a–13b are schematic views of an optical instrument in accordance with a fourth embodiment, the optical instrument combining a remote sensing interferometer and the MEMS Fabry-Perot demodulating interferometer used in tandem for locally replicating the state of a remote interferometer, the local interferometer being in transmission and the remote interferometer being in reflection.

One embodiment for putting into practice the above described FPDIs is shown in FIG. 13a, where the sensing interferometer 110 is configured to work in reflection. A Fabry-Perot sensor configured in reflection is easier to package, it can be made smaller and it requires one single optical fiber that brings light in and out of the sensor. The light signal encoded by the sensing interferometer 110 is decoded by the FPDI 111. A photodetector 112 located near the rear surface of the demodulating interferometer 111 captures the signal. The light intensity measured by the photodetector 112 corresponds to the cross-correlation between sensor 110 and FPDI 111 interferometers as given by relation (5).

$$I(d) = \int_\lambda R_{sensor}(\lambda, d_0) \cdot T_{dem}(\lambda, d) \cdot M(\lambda) \cdot d\lambda \quad (5)$$

where:

$R_{sensor}(\lambda,d_0)$ is the reflectance of the sensor 110 for a cavity length $d_0$;

$T_{dem}(\lambda,d)$ is the transmittance of the demodulator 111 for a cavity length d;

$M(\lambda)$ takes into account the light source spectrum, responsivity of the detector, and all other losses in the optical system.

Figure 13B:
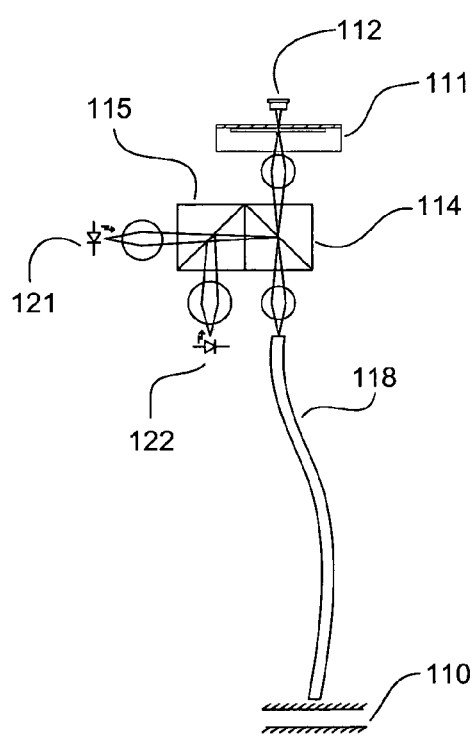

White light source 113 signal is first separated in two light beams by an optical splitter 114. The white-light source 113 can be a tungsten filament lamp, an LED or the combination of two or more LEDs. The light signal emitted by two or more LEDs 121, 122 can be combined with the addition of an optical combiner 115 (splitter) to create a composite light source such as shown in FIG. 13b. The optical splitters 114, 115 can be a fused biconical taper coupler, a bulk optic splitter such as a prism, an optical window, or the like. When using a bulk optic splitter, optical elements 116, 117 are added for focusing the light signal in and out of the optical fiber 118. The optical fiber 118 can be multimode or single mode. Single mode fiber is best suited when the light signal must travel through very long lead fiber. Single mode fiber also provides better stability and higher accuracy since there is no such modal noise as in the multimode fiber counter part. On the other hand, multimode fiber is well suited for low cost applications, where lead fiber length is short.

The light signal guided toward the sensing interferometer 110 by way of the optical fiber 118 is wavelength encoded according to relation (1). Reflected encoded light signal is re-collected by the same optical fiber 118 and directed back toward the optical splitter 114. Portion of the light signal 119 is then guided toward the Fabry-Perot demodulating interferometer 111. The light signal 119 encoded by the sensing interferometer 110 is then focused by way of a focusing lens 120 such that the focused spot 123 is located there between the mirrors constituting the Fabry-Perot interferometer of the FPDI 111. Focusing the light beam is better then collimating because a smaller spot is obtained. A smaller spot allows the deflecting diaphragm of the FPDI to bow while still having adequate interference visibility. It is worth noting that the optical light beam used in combination with a Fabry-Perot spectrophotometer must be collimated so as to maintain a high finesse, which consequently prevents the light beam from being focused. A larger aperture is then required and thus, stringent tolerance on the parallelism of the mirrors is needed for Fabry-Perot spectrophotometer.

The embodiments shown in FIG. 13a and FIG. 13b are operated as follows. A periodic square wave voltage, for example, is applied between the electrodes to generate a periodic time variable pulling force. As a result of the pulling force, the diaphragm oscillates at same frequency as the applied periodic voltage. The capacitance between the electrodes varies as a function of their separation. The relation between the capacitance and the Fabry-Perot cavity length is first obtained and used as the calibration table. Both the capacitance and the light intensity that reaches the detectors are continuously measured while the diaphragm oscillates. The capacitance and the light intensity are digitized and saved into a memory buffer with the same time basis. The light intensity is then processed so as to localize the time position where the minimum cross-correlation occurred. One interferometer being in reflection and the other in transmission, the Fabry-Perot cavity length of the sensing interferometer equals the FPDI cavity length when minimum cross-correlation occurs. The capacitance that corresponds to the position of the minimum correlation is then retrieved and converted into FPDI cavity length using the above said calibration table. The FPDI cavity length is finally converted into engineering unit.

Another method consists in measuring the Fabry-Perot cavity length by assessing the deflection of the diaphragm, the deflection being obtained by measuring the stress in the diaphragm by way of piezo-resistors diffused in the surface of the diaphragm. From time to time, the diaphragm deflection as obtained with the piezo-resistors is re-initialized by comparing with the capacitance measurement. For improved accuracy, this re-initialization is obtained in static mode.

Figure 14:
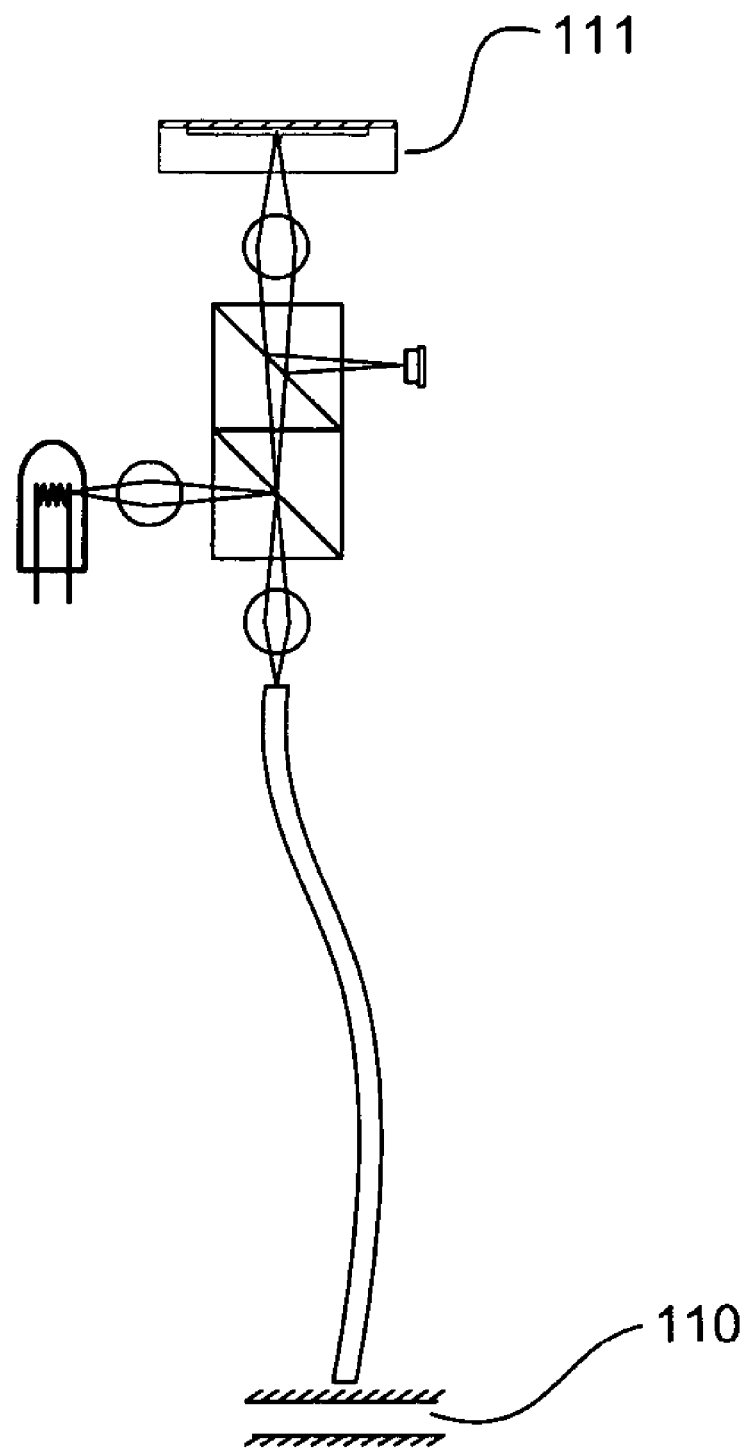
FIG. 14 is another schematic view of two interferometers of FIGS. 13a and 13b used in tandem for locally replicating the state of a remote interferometer, both interferometers being in reflection.
Figure 15:
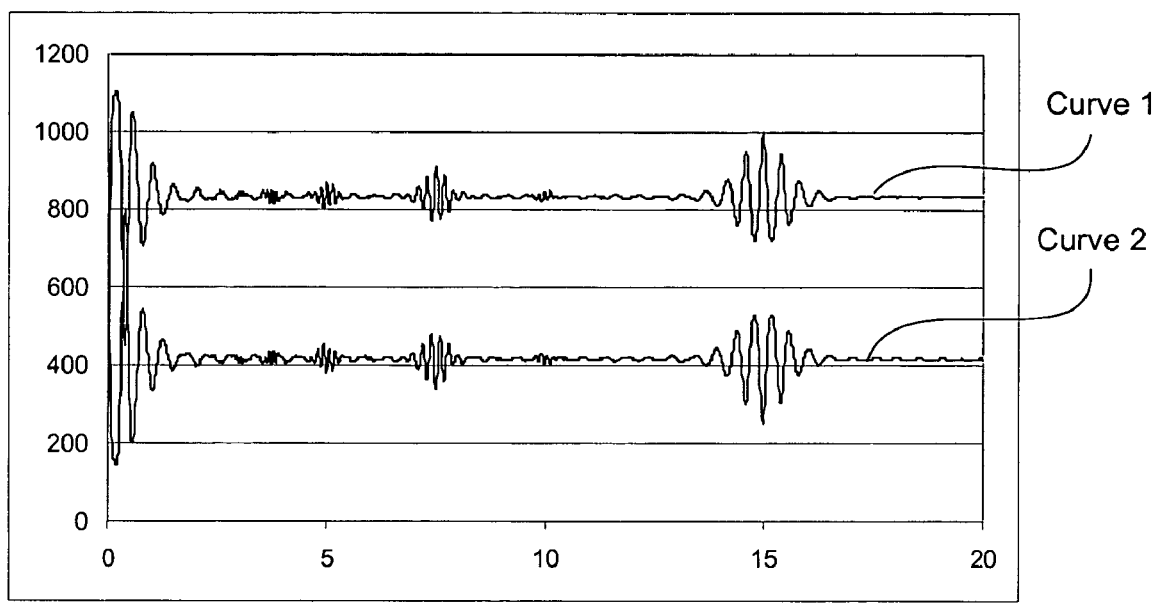
FIG. 15 is a graph illustrating the cross-correlation function obtained when both interferometers are operated in reflection (curve 1), and when one is in transmission and the other in reflection (curve 2)

A silicon diaphragm is opaque to wavelength below 1000 nm, thus preventing the use of a silicon detector positioned on the rear surface of the FPDI. Another embodiment for measuring the cavity length of a remote interferometer is shown in FIG. 14, where both the sensing 110 and the demodulating interferometers 111 are configured to work in reflection. This configuration is best suited whenever the moving mirror of the demodulating interferometer 111, or the second mirror, is opaque at the wavelength of interest. FIG. 15 shows typical cross-correlated signal obtained with the configuration of FIG. 13a (curve 2) as well as a typical cross-correlated signal obtained with the configuration of FIG. 14 (curve 1)). One can see that the DC level of the cross-correlation is lower for this second configuration (curve 2), and thus the signal to noise ratio is slightly improved for that configuration. The optimal cross-correlated signal obtained when both interferometers are in reflection or in transmission corresponds to a maximum, while the optimal cross-correlated signal obtained when one interferometer is in transmission and the other in reflection corresponds to a minimum. For that reason, the position where both interferometers are maximally correlated is also referred as to the position of optimal output signal.

Figure 7:
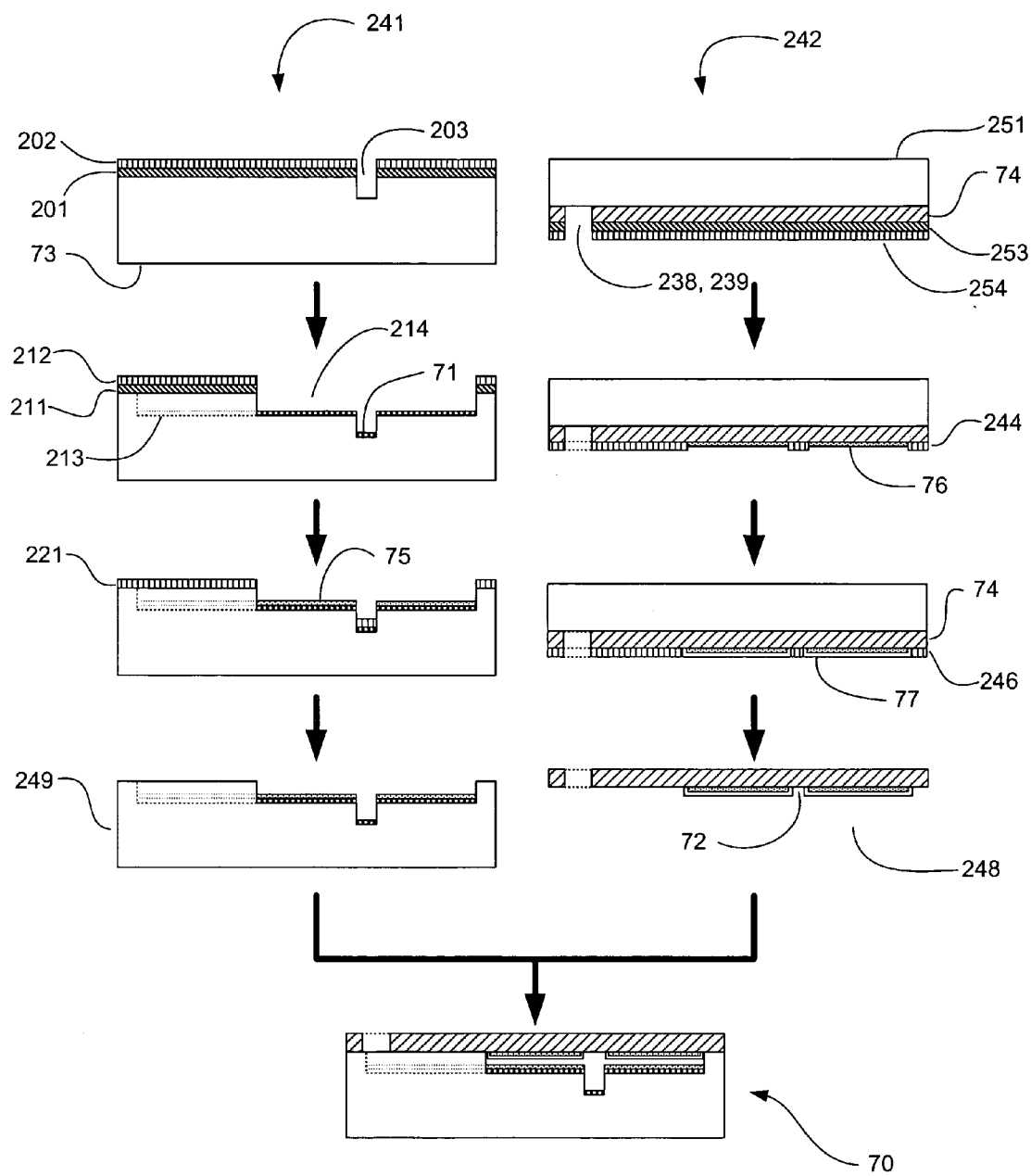
FIG. 7 is a series of cross-sectional views illustrating the process steps for fabricating the MEMS Fabry-Perot demodulating interferometer of precedent FIG. 6.

The FPDIs shown in FIGS. 7, 9 and 10, or similar, that uses electrostatic actuation force are very simple to manufacture, they are very cheap to produce because of their complete compatibility with MEMS production techniques, and they are very low power consuming devices. On the other hand, they are better suited for dynamically operated diaphragm if one considers the level of the required driving voltage must be kept to a minimum. Other diaphragm actuation methods are better suited for tuning the diaphragm such that static positioning is obtained, as discusses in the following.

Although we have described a method for determining the cavity length of a FP sensor interferometer, it will be obvious for someone skilled in the art that the same method can be applied to determine the path length of other types of interferometer such as, for example, a Michelson interferometer or a Mach-Zehnder interferometer, where in these cases, the interferometers are two beams interferometers. To make a correspondence with the path length of a Fabry-Perot defined as the distance separating the two mirrors of the cavity, the path length of a Michelson interferometer or a Mach-Zehnder interferometer would correspond to half the travelling difference of the two beams. The above description is thus by no means limited to determine the cavity length of a FP sensor.

Sixth Embodiment of the Present Invention

Figure 16:
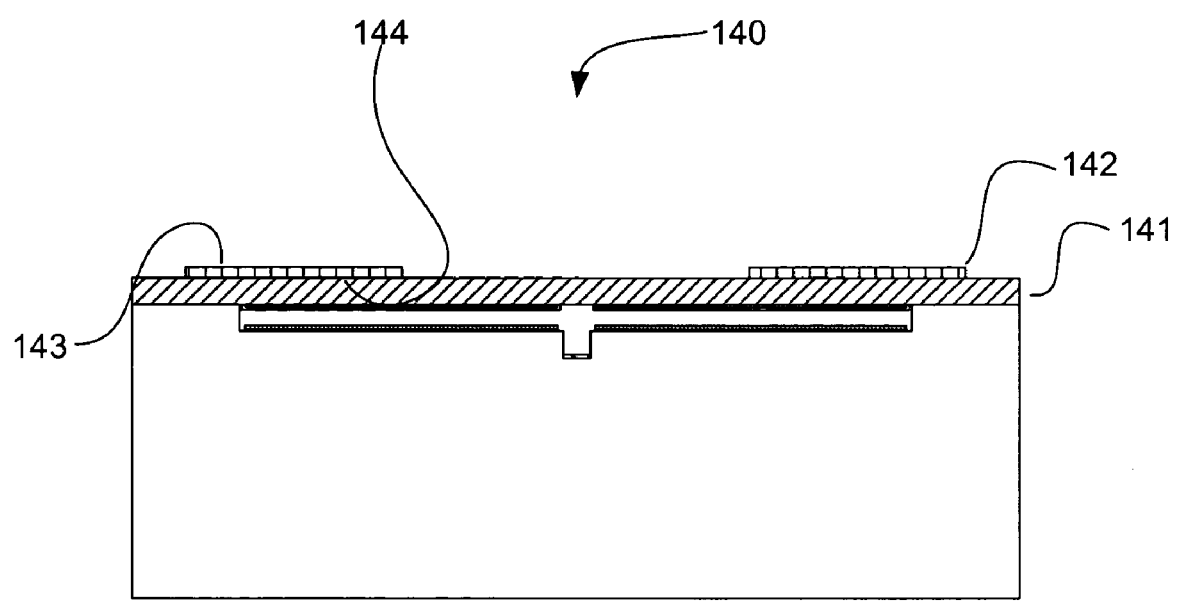
FIG. 16 is a cross-sectional view of a MEMS Fabry-Perot demodulating interferometer actuated with a piezo-electric disc in accordance with a fifth embodiment of the present invention.

FIG. 16 shows another embodiment 140 where the diaphragm 141 is actuated by a piezo-electric monomorph actuator 142. A thin piezo-electric disc 142 is bonded on the surface of the diaphragm 141, or it is deposited using methods known in the art. The dimension of the piezo-electric disc changes as a result of the application of a differential voltage between the upper 143 and lower 144 surfaces. The piezo-electric 142 and the diaphragm 141 then behave as a bimorph, deflecting the diaphragm in one direction or the other depending on the polarity of the voltage. The FP cavity length is then measured using the same methods described for the first embodiment 70.

Seventh Embodiment of the Present Invention

Figure 17:
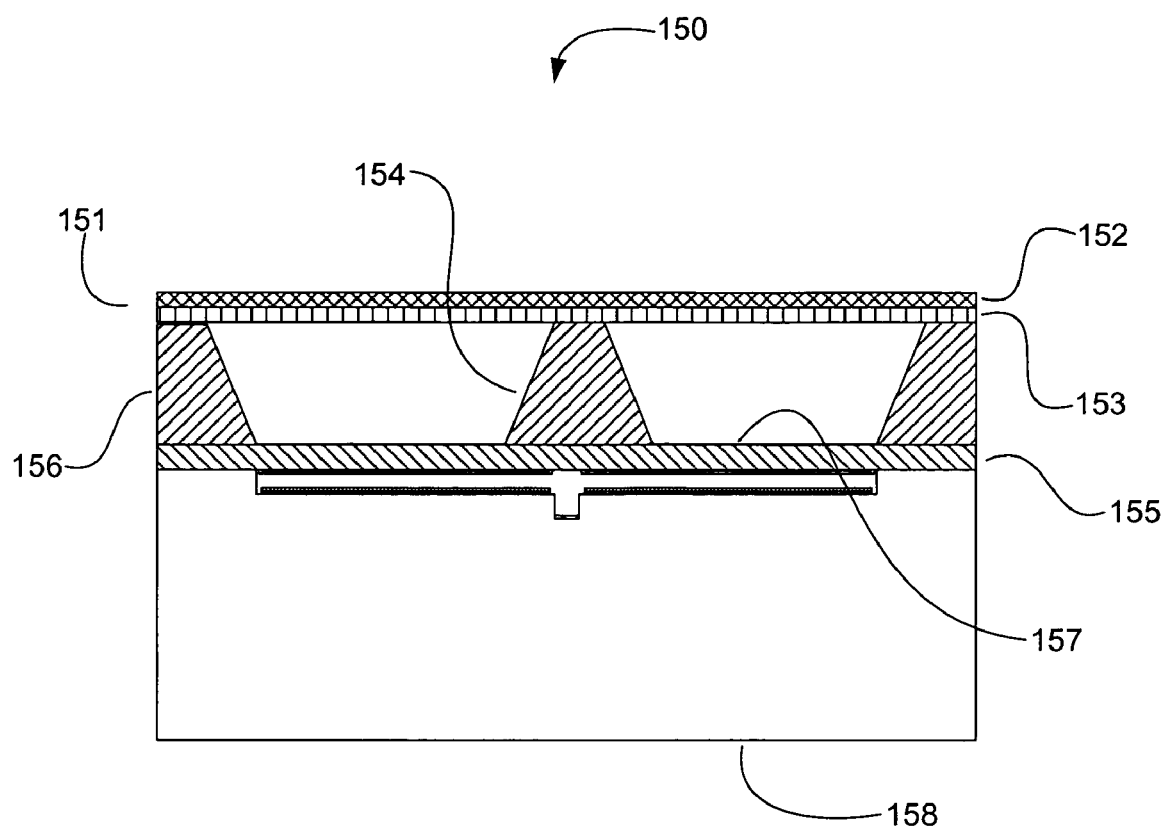
FIG. 17 is a cross-sectional view of a MEMS Fabry-Perot demodulating interferometer actuated with a piezo-electric bimorph in accordance with a sixth embodiment of the present invention.
Figure 18:
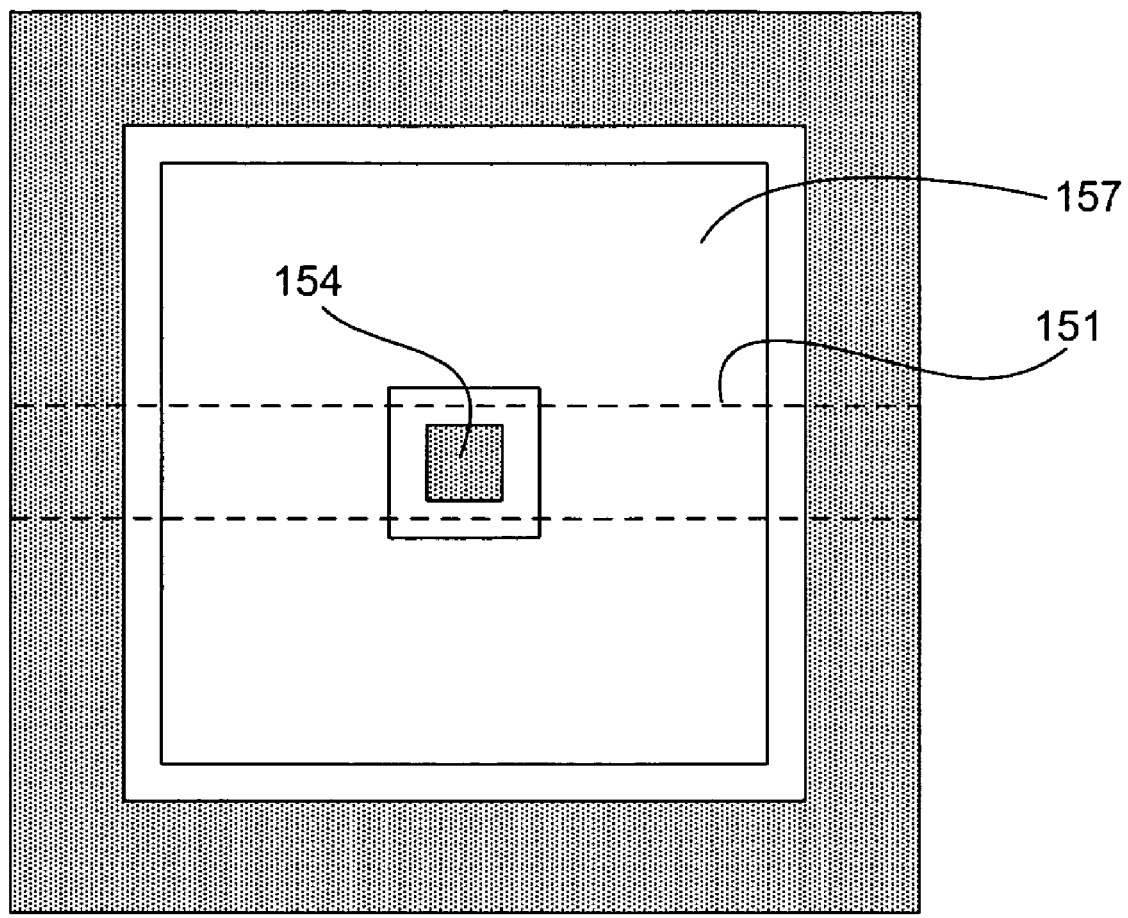
FIG. 18 is a top view of the MEMS Fabry-Perot demodulating interferometer of FIG. 17.

Another embodiment 150 shown in FIG. 17 uses a piezo-electric bimorph 151 made of two similar piezo-electric elements 152, 153 assembled to have one expanding and the other contracting upon the application of a voltage. Such a piezo-electric bimorph 151 can be mounted so that the force applied on the center of the diaphragm is controlled by the voltage applied on the bimorph. FIG. 17 shows this embodiment, where the center of the diaphragm contains a pin 154 for minimizing any unwanted forces, such a lateral and bending forces. The construction of such a diaphragm starts with a (100) undoped silicon substrate. An epitaxial heavily boron doped silicon ($>10^{20}$ $cm^{-3}$) etch stop layer 155 is grown on one surface of the undoped silicon 156. Similarly, boron can be diffused into the silicon substrate. This epitaxial layer will later constitute the diaphragm 157. An oxide layer is thermally grown on both surfaces of the silicon substrate by heating at 1100° C. for a period of 6 hours. The oxide will serve as a mask for etching the silicon according to the desired pattern shown in FIG. 18. The first surface of the silicon substrate is photolithographically patterned, for removing the oxide using a buffered HF solution. After etching the oxide, the silicon substrate is anisotropically etched using EDP etching solution. The silicon substrate is anisotropically etched by following the (111) planes, until it reaches the etch stop 155. The diaphragm 157 thus obtained is anodically bonded to the glass substrate 158. Upon bending, the piezo-electric bimorph 157 exerts a force on the central silicon pin 154.

Electromagnetic forces can also be used for actuating the diaphragm. In this case, a permanent magnet can be deposited or bonded on the center of the diaphragm. A coil located in close proximity generates a pulling or pushing force depending on the polarity of the current. Other actuation methods can also be used for actuating the diaphragm, such as forces induced by a thermal bilame, magnetostrictive or electrostrictive materials. It also worth mentioning that the force needed to deflect the diaphragm can always be reduced by providing various tether patterns on the diaphragm.

All embodiments, examples, alternatives and the like set forth are strictly by way of non-limiting example. While the invention has been described in terms of preferred embodiments with variations in construction, those skilled in the art will recognize that the invention can be practiced with modification within the spirit and scope of the appended claims.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method for measuring a sensing interferometer path length, said method comprising:
    providing a micro-electromechanical system (MEMS) Fabry-Perot cavity, said Fabry-Perot cavity having a cavity length and being formed by a first surface and a second surface;
    admitting into said Fabry-Perot cavity a broadband light signal from said sensing interferometer;
    varying the cavity length for obtaining an optimal output signal from the Fabry-Perot cavity; and
    outputting said optimal output signal for determining, from the cavity length at optimal output signal, the sensing interferometer path length.

2. The method as claimed in claim 1, wherein said admitting broadband light signal from said sensing interferometer comprises focalizing said broadband light into the MEMS Fabry-Perot cavity.

3. The method as claimed in claim 1, wherein providing a MEMS Fabry-Perot cavity comprises providing a MEMS Fabry-Perot cavity having a finesse that is less than 10.

4. The method as claimed in claim 1, wherein said varying comprises scanning the cavity length within a range of lengths corresponding to a possible range of the sensing interferometer path length.

5. The method as claimed in claim 4, wherein obtaining an optimal output signal comprises measuring, from the MEMS Fabry-Perot cavity, a plurality of output light signals corresponding to a plurality of cavity lengths and from said plurality of measured output light signals determining the optimal output signal.

6. The method as claimed in claim 1, wherein said varying the cavity length comprises moving at least one of said first and second surfaces using at least one of an electrostatic force, a magnetic force, an electromagnetic force, an acoustical force and a thermal force.

7. The method as claimed in claim 1, wherein said varying the cavity length comprises applying, between said first and second surfaces, an electrical potential difference and changing a distance between said surfaces by varying said electrical potential difference.

8. The method as claimed in claim 1, wherein said varying the cavity length comprises bringing one of said surfaces in oscillation by applying an alternative electrical potential difference between first and second surfaces.

9. The method as claimed in claim 1, further determining the cavity length of said MEMS Fabry-Perot cavity.

10. The method as claimed in claim 9, wherein said determining the cavity length comprises at least one of measuring a capacity value of the MEMS Fabry-Perot cavity and monitoring a stress in one of said first and second surfaces using a piezo-resistor.

11. The method as claimed in claim 10, wherein said varying the cavity length comprises bringing one of said surfaces in oscillation by applying an alternative electrical potential difference between first and second surfaces, and further wherein said capacitance value provides a reference value for a given cavity length.

12. The method as claimed in claim 1, wherein said sensing interferometer comprises a Fabry-Perot sensor having a sensor cavity formed by a first sensor surface and a second sensor surface, said sensor cavity having a sensor cavity length, and wherein the path length is the sensor cavity length.

13. The method as claimed in claim 12, wherein said varying comprises scanning the cavity length within a range of lengths corresponding to a possible range of the sensing interferometer path length.

14. The method as claimed in claim 13, wherein said varying comprises varying the cavity length by scanning the cavity length in a range of about 15 microns.

15. The method as claimed in claim 13, wherein said obtaining an optimal output signal by varying the cavity length comprises obtaining a cross-correlation signal from the Fabry-Perot cavity as a function of the cavity length and determining at which cavity length the cross-correlation signal is optimal, therefore obtaining the optimal output signal.

16. The method as claimed in claim 15, wherein said obtaining a cross-correlation signal comprises measuring an output light signal from the MEMS Fabry-Perot cavity and integrating said output light signal over its wavelength contents.

17. The method as claimed in claim 16 comprising measuring the output light signal with a broadband detector for generating said cross-correlated signal.

18. The method as claimed in claim 15, wherein providing a MEMS Fabry-Perot cavity comprises providing a MEMS Fabry-Perot cavity having a finesse that is less than 10.

19. The method as claimed in claim 15, further comprising:
providing a broadband light source;
illuminating an input surface of said Fabry-Perot sensor with said broadband light source to produce said broadband light signal from the sensing interferometer, said input surface of said Fabry-Perot sensor being partly reflecting and comprising said first sensor surface of the cavity of the Fabry-Perot sensor;
relaying, to the MEMS Fabry-Perot cavity, said broadband light signal so that it can be admitted.

20. The method as claimed in claim 19, wherein said optimal output signal is a maximum of said cross-correlation signal.

21. The method as claimed in claim 20, wherein said varying the cavity length comprises moving at least one of said first and second surfaces using at least one of an electrostatic force, a magnetic force, an electromagnetic force, an acoustical force and a thermal force.

22. The method as claimed in claim 20, wherein said varying the cavity length comprises applying, between said first and second surfaces, an electrical potential difference and changing a distance between said surfaces by varying said electrical potential difference.

23. The method as claimed in claim 20, wherein said varying the cavity length comprises bringing one of said surfaces in oscillation by applying an alternative electrical potential difference between first and second surfaces.

24. The method as claimed in claim 20, further determining the cavity length of said MEMS Fabry-Perot cavity.

25. The method as claimed in claim 24, wherein said determining the cavity length comprises at least one of measuring a capacity value of the MEMS Fabry-Perot cavity and monitoring a stress in one of said first and second surfaces using a piezo-resistor.

26. The method as claimed in claim 25, wherein said varying the cavity length comprises bringing one of said surfaces in oscillation by applying an alternative electrical potential difference between first and second surfaces, and further wherein said capacitance value provides a reference value for a given cavity length.

27. The method as claimed in claim 19, wherein said broadband light signal comprises a light signal reflected by said first sensor surface, therefore measuring the sensor cavity length of the Fabry-Perot sensor operated in reflection mode.

28. The method as claimed in claim 19, wherein said relaying comprises guiding the broadband light signal using an optical fiber between the Fabry-Perot sensor and the MEMS Fabry-Perot cavity.

29. The method as claimed in claim 28, wherein said fiber comprises at least one of a single mode fiber and a multimode fiber.

30. The method as claimed in claim 19, comprising:
admitting into the MEMS Fabry-Perot cavity the broadband light signal from the first surface of the MEMS Fabry-Perot cavity, said first surface being partly reflecting; and
measuring the output light signal being reflected by said first surface of the MEMS Fabry-Perot cavity,
thereby obtaining the optimal output signal from the MEMS Fabry-Perot cavity operated in reflection mode.

31. The method of claim 1, wherein the second surface forming at least a part of a deflectable diaphragm, wherein said deflectable diaphragm has a pre-determined shape and a perimeter; and wherein said varying the cavity length further comprises deflecting the diaphragm towards the first surface, starting at the perimeter of the diaphragm, to thereby vary the cavity length of the MEMS cavity.

32. The method as claimed in claim 31, wherein said pre-determined shape is formed by applying a pressure difference between a first side and a second side of the diaphragm.

33. The method as claimed in claim 32, wherein said first side is facing the MEMS cavity and wherein the pressure in the cavity is higher than the pressure on the second side of the diaphragm, thereby generating said shape of the diaphragm.

34. The method as claimed in claim 31, wherein said deflecting the diaphragm comprises applying between said first surface and said deflecting diaphragm a variable electrical potential difference to thereby vary the cavity length of the MEMS cavity.

35. The method as claimed in claim 31, wherein the MEMS further comprises a volume formed by the cavity, by an input channel connected to the cavity and by an output channel connected to the cavity, and wherein varying said cavity length varies said volume.

36. The method as claimed in claim 35, wherein said deflecting the diaphragm comprises controlling a flow of a substance through the volume of the MEMS.

37. A Fabry-Perot micro-electromechanical system (FP-MEMS) device, used in the measurement of a sensing interferometer path length, said path length having a path length range, the device comprising:
 a first surface and a second surface forming a Fabry-Perot cavity having a variable cavity length;
 a substrate comprising said first surface, said substrate being adapted to relay light from the sensing interferometer to the Fabry-Perot cavity;
 a deflectable diaphragm supported by the substrate and comprising said second surface; and
 means for deflecting the diaphragm over at least the same range as said path length range.

38. The FP-MEMS as claimed in claim 37 further comprising means for determining said cavity length.

39. The FP-MEMS as claimed in claim 37, wherein said deflectable diaphragm comprises a perimeter at least partly bonded to the substrate.

40. The FP-MEMS as claimed in claim 37, wherein said first surface comprises an area being coated with a partly reflective coating.

41. The FP-MEMS as claimed in claim 39, wherein said deflectable diaphragm comprises tethers located at the perimeter of said diaphragm.

42. The FP-MEMS as claimed in claim 37, wherein said first surface comprises an embedded photodetector.

43. The FP-MEMS as claimed in claim 37, wherein said means for deflecting the diaphragm comprises a first electrode, a second electrode and a driving circuit, said driving circuit being connected to said electrodes to deflect the diaphragm.

44. The FP-MEMS as claimed in claim 37, wherein said means for deflecting the diaphragm comprises a magnet on one of said first and second surfaces and a controllable magnetic force.

45. The FP-MEMS as claimed in claim 37, wherein said substrate comprises a first recessed cavity providing said first surface.

46. The FP-MEMS as claimed in claim 45, wherein means for deflecting the diaphragm comprises a first electrode, a second electrode and a driving circuit, said driving circuit being connected to said electrodes, to deflect the diaphragm.

47. The FP-MEMS as claimed in claim 46 further comprising a capacitance measurement unit connected to said first and second electrodes for determining a capacity of said capacitive cavity.

48. The FP-MEMS as claimed in claim 46 further comprising:
 a second recessed cavity formed in the substrate, said second recessed cavity being near the first surface and being coated with a conductive layer for providing at least a portion of the first electrode; and
 a conductive layer deposited on selected area of the diaphragm for providing the second electrode, said second electrode at least partially facing the first electrode for forming a capacitive cavity.

49. The FP-MEMS as claimed in claim 48, further comprising a capacitance measurement unit connected to said first and second electrodes for determining a capacity of said capacitive cavity.

50. The FP-MEMS as claimed in claim 49, wherein said deflectable diaphragm comprises tethers located at a perimeter of said diaphragm.

51. The FP-MEMS as claimed in claim 49, wherein said second surface comprises an embedded photodetector.

52. The FP-M EMS as claimed in claim 48, wherein said driving circuit comprises:
 a recessed channel formed in the substrate, said recessed channel having one end connected to the second recessed cavity and the other end linked to a first FP-MEMS opening, and said recessed channel being coated with a conductive layer for providing an electrical link from the first FP-MEMS opening to the first electrode;
 a conductive layer deposited on another a selected area of the diaphragm for providing a diaphragm electrical link, said diaphragm electrical link being connected to the second electrode; and
 a conductive layer deposited a selected area of the substrate for providing an electrical link from a second FP-MEMS opening to the second electrode through the diaphragm electrical link.

53. The FP-MEMS as claimed in claim 37, wherein said means for deflecting the diaphragm comprises a piezoelectric portion having a variable dimension and being supported by the diaphragm and wherein by electrically controlling the piezo electric portion dimension, said diaphragm is deflected.

54. The FP-MEMS as claimed in claim 53, wherein said means for deflecting the diaphragm further comprises another piezo-electric portion and wherein a difference in an electrical potential between said piezo-electric portions deflects said diaphragm.

55. The FP-MEMS device of claim 37, wherein said substrate further comprises an attractive surface;
 wherein said deflectable diaphragm has a pre-determined shape and comprises a perimeter, wherein said perimeter is in close proximity to said attractive surface; and
 wherein said means for deflecting the diaphragm comprises means for deflecting the diaphragm towards the attractive surface starting with the perimeter of the diaphragm.

56. The MEMS device as claimed in claim 55, wherein said means for deflecting the diaphragm comprises a first electrode, a second electrode and a driving circuit, said driving circuit being connected to said electrodes to deflect the diaphragm.

57. The MEMS device as claimed in claim 56, wherein the first electrode comprises at least a portion of the attractive surface and the second electrode comprises at least the perimeter of the diaphragm.

58. The MEMS device as claimed in claim 57, wherein said portions comprises a conductive layer.

59. The MEMS device as claimed in claim 56, wherein said driving circuit is an electrical circuit providing a variable electrostatic potential difference between said diaphragm and said attractive surface.

60. The MEMS device as claimed in claim 59, wherein said pre-shaped diaphragm has a bell shape providing a larger distance between said second end surface and said attractive surface than the distance between the perimeter and the attractive surface.

61. The MEMS device as claimed in claim 60, further comprising a chamber structure supported by the diaphragm, said chamber structure providing a pressure difference between a first side and a second side of the diaphragm, wherein said first side is facing the attractive surface.

62. The MEMS device as claimed in claim 60, wherein said first end and second end surfaces form a FP cavity having a cavity length.

63. The MEMS device as claimed in claim 60, wherein said substrate comprises an input channel volume connected to the cavity and an output channel volume connected to the cavity, wherein the input channel volume, the output channel volume and the said cavity form a volume.

64. An apparatus for measuring a sensing interferometer path length, said apparatus comprising:
  a micro-electromechanical system (MEMS) Fabry-Perot cavity having a cavity length, said cavity being adapted to admit a broadband light signal from said sensing interferometer and to produce an output light signal;
  means for varying the cavity length;
  a detector for receiving the output light signal and for providing an optimal output signal upon varying said cavity length; and
  means for measuring the cavity length to thereby determine from the cavity length at optimal output signal, the sensing interferometer path length.

65. The apparatus as claimed in claim 64, wherein said detector is sensitive over a range of a wavelengths comprised in said output light signal and integrates said output light signal over said range of wavelengths to provide for an output intensity signal.

66. The apparatus as claimed in claim 64, wherein means for determining the cavity length at optimal output signal comprises a controller and processor unit, said controller and processor unit controlling said means for varying the cavity length, acquiring said output intensity signal, acquiring said cavity length and establishing, from said output intensity signal, the optimal output signal.

67. The apparatus as claimed in claim 64, further comprising means to relay said broadband light signal from the sensing interferometer to the MEMS Fabry-Perot cavity.

68. The apparatus as claimed in claim 67, wherein said means to relay comprises an optical fiber optically coupled to the sensing interferometer and to the MEMS Fabry-Perot cavity.

69. The apparatus as claimed in claim 68, wherein said optical fiber comprises at least one of a single-mode optical fiber and a multi-mode optical fiber.

70. The apparatus as claimed in claim 68, wherein said optical fiber is optically coupled to the MEMS Fabry-Perot cavity using a focalizing lens.

71. The apparatus as claimed in claim 68 further comprising at least one of an optical splitter and a coupler for optically coupling said optical fiber to the MEMS Fabry-Perot cavity.

72. The apparatus as claimed in claim 64, further comprising a broadband light source relayed to an input of the sensing interferometer for generating a broadband light signal from the sensing interferometer.

73. The apparatus as claimed in claim 64, wherein said MEMS Fabry-Perot cavity comprises:
  a first surface and a second surface forming the Fabry-Perot cavity;
  a substrate comprising said first surface, said substrate being adapted to relay light from the sensing interferometer to the Fabry-Perot cavity;
  a deflectable diaphragm supported by the substrate and comprising said second surface.

74. The apparatus as claimed in claim 73, wherein said deflectable diaphragm comprises a perimeter at least partly bonded to the substrate.

75. The apparatus as claimed in claim 74, wherein said deflectable diaphragm comprises tethers located at the perimeter of said diaphragm.

76. The apparatus as claimed in claim 73, wherein said first surface comprises an area being coated with a partly reflective coating.

77. The apparatus as claimed in claim 73, wherein said detector is embedded in said first surface.

78. The apparatus as claimed in claim 73, wherein said means for varying the cavity length comprises means for deflecting said diaphragm.

79. The apparatus as claimed in claim 78, wherein said means for deflecting the diaphragm comprises a first electrode, a second electrode and a driving circuit, said driving circuit being connected to said electrodes to deflect the diaphragm.

80. The apparatus as claimed in claim 79, wherein said substrate comprises a first recessed cavity providing said first surface.

81. The apparatus as claimed in claim 80, further comprising:
  a second recessed cavity formed in the substrate, said second recessed cavity being near the first surface and being coated with a conductive layer for providing at least a portion of the first electrode; and
  a conductive layer deposited on selected area of the diaphragm for providing the second electrode, said second electrode at least partially facing the first electrode for forming a capacitive cavity.

82. The apparatus as claimed in claim 81, wherein means for measuring the cavity length comprises a capacitance measurement unit connected to said first and second electrodes.

83. The apparatus as claimed in claim 81, wherein means for measuring the cavity length comprises a piezo-resistor measuring a stress in said diaphragm.

84. The apparatus as claimed in claim 81, further comprising means to relay said broadband light signal from the sensing interferometer to the MEMS Fabry-Perot cavity.

85. The apparatus as claimed in claim 84, wherein said means to relay comprises an optical fiber optically coupled to the sensing interferometer and to the MEMS Fabry-Perot cavity.

86. The apparatus as claimed in claim 85, wherein said optical fiber comprises at least one of a single-mode optical fiber and a multi-mode optical fiber.

87. The apparatus as claimed in claim 85, wherein said optical fiber is optically coupled to the MEMS Fabry-Perot cavity using a focalizing lens.

88. The apparatus as claimed in claim 85, further comprising a beam splitter to relay said broadband light signal to the Fabry-Perot cavity and to relay said output light signal from the Fabry-Perot cavity to the detector.

89. The apparatus as claimed in claim 81, further comprising a broadband light source relayed to an input of the sensing interferometer for generating a broadband light signal from the sensing interferometer.

90. The apparatus as claimed in claim 81, wherein said driving circuit comprises:

a recessed channel formed in the substrate, said recessed channel having one end connected to the second recessed cavity and the other end linked to a first MEMS Fabry-Perot opening, and said recessed channel being coated with a conductive layer for providing a electrical link from the first MEMS Fabry-Perot opening to the first electrode;

a conductive layer deposited on another selected area of the diaphragm for providing a diaphragm electrical link, said diaphragm electrical link being connected to the second electrode; and a conductive layer deposited a selected area of the substrate for providing an electrical link from a second MEMS Fabry-Perot opening to the second electrode through the diaphragm electrical link.

91. The apparatus as claimed in claim 78, wherein said means for deflecting the diaphragm comprises a piezo-electric portion having a variable dimension and being supported by the diaphragm and wherein by electrically controlling the piezo electric portion dimension, said diaphragm is deflected.

92. The apparatus as claimed in claim 91, wherein said means for deflecting the diaphragm further comprises another piezo-electric portion and wherein a difference in an electrical potential between said piezo-electric portions deflects said diaphragm.

* * * * *